US012630225B2

(12) United States Patent
Kuipers et al.

(10) Patent No.: US 12,630,225 B2
(45) Date of Patent: May 19, 2026

(54) ROCKER INSERT WITH WAVE-SHAPED STRUCTURE

(71) Applicant: Shape Corp., Grand Haven, MI (US)

(72) Inventors: Matthew Kuipers, Holland, MI (US); Zehua Qin, Norton Shores, MI (US); Joseph R. Matecki, Allendale, MI (US); Bruce Walsh, West Bloomfield, MI (US); Marcus Ashmore, Farmington Hills, MI (US)

(73) Assignee: Shape Corp., Grand Haven, MI (US)

( * ) Notice: Subject to any disclaimer, the term of this patent is extended or adjusted under 35 U.S.C. 154(b) by 316 days.

(21) Appl. No.: 18/126,926

(22) Filed: Mar. 27, 2023

(65) Prior Publication Data

US 2023/0303179 A1 Sep. 28, 2023

Related U.S. Application Data

(60) Provisional application No. 63/269,927, filed on Mar. 25, 2022.

(51) Int. Cl.
*B62D 21/15* (2006.01)

(52) U.S. Cl.
CPC ................................. *B62D 21/157* (2013.01)

(58) Field of Classification Search
CPC ............................ B62D 21/157; B62D 25/025
See application file for complete search history.

(56) References Cited

U.S. PATENT DOCUMENTS

| | | | |
|---|---|---|---|
| 1,895,171 A | 1/1933 | Nelson et al. | |
| 2,012,057 A | 8/1935 | Swallow | |
| 4,221,413 A | 9/1980 | Bonnetain | |
| 5,680,886 A | 10/1997 | Ohtsuka | |
| 6,435,601 B1 | 8/2002 | Takahara | |
| 7,963,378 B2 | 6/2011 | Glance et al. | |
| 9,493,190 B1 | 11/2016 | Alwan et al. | |

(Continued)

FOREIGN PATENT DOCUMENTS

| | | |
|---|---|---|
| DE | 102007032245 A1 | 1/2009 |
| DE | 102010003497 A1 | 10/2011 |

(Continued)

OTHER PUBLICATIONS

International Search Report for Application No. PCT/US2023/016452; mailed Jun. 13, 2023; 3 pp.

(Continued)

*Primary Examiner* — Lori Lyjak
(74) *Attorney, Agent, or Firm* — Bodman PLC

(57) ABSTRACT

A vehicle rocker assembly includes a sill outer and a sill inner that together define an elongated hollow interior. The vehicle rocker assembly also includes a rocker insert disposed within the elongated hollow interior. The rocker insert includes a stiffening member defining a wave-shaped structure and including at least one sheet defining a fore edge, an aft edge, a first side edge and a second side edge opposite the first side edge. Additionally, the fore edge and the aft edge are disposed at different locations along the length of the rocker insert. Moreover, a crest of the wave-shaped structure extends between the first side edge and the second side edge and is configured to carry a load path laterally between the inboard and outboard wall portions.

20 Claims, 15 Drawing Sheets

(56) References Cited

U.S. PATENT DOCUMENTS

| | | | |
|---|---|---|---|
| 9,725,118 | B2 | 8/2017 | Alwan et al. |
| 10,011,304 | B1 | 7/2018 | Donabedian et al. |
| 10,046,422 | B2 | 8/2018 | Baldwin |
| 10,155,542 | B2 | 12/2018 | Gao et al. |
| 10,183,638 | B2 | 1/2019 | Zannier |
| 10,279,843 | B2 | 5/2019 | Nakagawa et al. |
| 10,328,978 | B2 | 6/2019 | Yang et al. |
| 10,370,040 | B1 | 8/2019 | Cooper et al. |
| 10,399,602 | B2 | 9/2019 | Jun et al. |
| 10,835,942 | B2 | 11/2020 | Weykamp et al. |
| 11,292,407 | B2 | 4/2022 | Riva |
| 11,745,802 | B2 | 9/2023 | Song |
| 12,043,314 | B2 | 7/2024 | Bodin et al. |
| 12,448,049 | B2 | 10/2025 | Munjurulimana et al. |
| 2017/0080980 | A1* | 3/2017 | Alwan .................... B60K 1/04 |
| 2019/0256150 | A1 | 8/2019 | Cooper et al. |
| 2019/0264769 | A1 | 8/2019 | Gergely et al. |
| 2020/0262491 | A1 | 8/2020 | Shannon et al. |
| 2021/0268976 | A1 | 9/2021 | Gibeau et al. |
| 2021/0339803 | A1 | 11/2021 | Haupt et al. |
| 2021/0380173 | A1 | 12/2021 | Kim |
| 2022/0063731 | A1 | 3/2022 | Tsubaki et al. |
| 2022/0212720 | A1 | 7/2022 | Oxley et al. |
| 2022/0250565 | A1 | 8/2022 | Godthi et al. |
| 2022/0258802 | A1 | 8/2022 | Tsubaki et al. |
| 2022/0289298 | A1 | 9/2022 | Kuipers |
| 2022/0315110 | A1 | 10/2022 | Ignes et al. |
| 2022/0410982 | A1 | 12/2022 | Hihara |
| 2023/0011721 | A1 | 1/2023 | Boettcher et al. |
| 2023/0016200 | A1 | 1/2023 | Matsui et al. |
| 2023/0072451 | A1 | 3/2023 | Song |
| 2023/0102921 | A1 | 3/2023 | Odhekar et al. |
| 2023/0108456 | A1 | 4/2023 | Karlsson et al. |
| 2023/0111879 | A1 | 4/2023 | Oxley et al. |
| 2023/0126494 | A1 | 4/2023 | Nihei |
| 2023/0147528 | A1 | 5/2023 | Qin et al. |
| 2023/0159107 | A1 | 5/2023 | Matecki et al. |
| 2023/0159110 | A1 | 5/2023 | Hwang |
| 2023/0202578 | A1 | 6/2023 | Maruyama |
| 2023/0202581 | A1 | 6/2023 | Maruyama et al. |
| 2023/0202582 | A1 | 6/2023 | Inagaki et al. |
| 2023/0219628 | A1 | 7/2023 | Hong et al. |
| 2023/0226898 | A1 | 7/2023 | Lee et al. |
| 2023/0303179 | A1 | 9/2023 | Kuipers et al. |
| 2024/0092426 | A1 | 3/2024 | Park et al. |
| 2024/0109401 | A1 | 4/2024 | Kuipers et al. |
| 2024/0286685 | A1 | 8/2024 | Lee et al. |
| 2024/0326916 | A1 | 10/2024 | Lee |

FOREIGN PATENT DOCUMENTS

| | | | |
|---|---|---|---|
| DE | 102014012082 | A1 | 2/2016 |
| DE | 102012206032 | B4 | 6/2017 |
| DE | 102017006057 | B4 | 5/2021 |
| EP | 1331160 | A1 | 7/2003 |
| EP | 1806271 | A2 | 7/2007 |
| EP | 2927101 | A1 | 10/2015 |
| EP | 3057851 | B1 | 1/2018 |
| EP | 3851335 | A1 | 7/2021 |
| FR | 3050165 | A1 | 10/2017 |
| JP | H05319301 | A | 12/1993 |
| JP | 2004051095 | A | 2/2004 |
| JP | 2010274848 | A | 12/2010 |
| JP | 2016052834 | A | 4/2016 |
| JP | 6566176 | B1 | 8/2019 |
| JP | 2021024350 | A | 2/2021 |
| JP | 2021146973 | A | 9/2021 |
| JP | 6964642 | B2 | 10/2021 |
| KR | 102447256 | B1 | 9/2022 |
| WO | 2017157886 | A1 | 9/2017 |
| WO | 2019059821 | A1 | 3/2019 |
| WO | 2020085385 | A1 | 4/2020 |
| WO | 2020225766 | A1 | 11/2020 |
| WO | 2021019959 | A1 | 2/2021 |
| WO | 2021060660 | A1 | 4/2021 |
| WO | 2021071410 | A1 | 4/2021 |
| WO | 2021116546 | A1 | 6/2021 |
| WO | 2021157651 | A1 | 8/2021 |
| WO | 2021180403 | A1 | 9/2021 |
| WO | 2021234433 | A1 | 11/2021 |
| WO | 2021244792 | A1 | 12/2021 |
| WO | 2021259840 | A1 | 12/2021 |
| WO | 2021259971 | A1 | 12/2021 |
| WO | 2022086005 | A1 | 4/2022 |
| WO | 2022192706 | A1 | 9/2022 |
| WO | 2022234999 | A1 | 11/2022 |
| WO | 2022238458 | A1 | 11/2022 |
| WO | 2023004309 | A1 | 1/2023 |
| WO | 2023277440 | A1 | 1/2023 |
| WO | 2023277441 | A1 | 1/2023 |
| WO | 2023277567 | A1 | 1/2023 |
| WO | 2023285005 | A1 | 1/2023 |
| WO | 2023012056 | A1 | 2/2023 |
| WO | 2023014808 | A1 | 2/2023 |
| WO | 2023016113 | A1 | 2/2023 |
| WO | 2023044429 | A1 | 3/2023 |
| WO | 2023052279 | A1 | 4/2023 |
| WO | 2023052388 | A1 | 4/2023 |
| WO | 2023064868 | A1 | 4/2023 |
| WO | 2023069918 | A1 | 4/2023 |
| WO | 2023079804 | A1 | 5/2023 |
| WO | 2023079805 | A1 | 5/2023 |
| WO | 2023081810 | A1 | 5/2023 |
| WO | 2023085162 | A1 | 5/2023 |
| WO | 2023085689 | A1 | 5/2023 |
| WO | 2023088660 | A1 | 5/2023 |
| WO | 2023089887 | A1 | 5/2023 |
| WO | 2023090112 | A1 | 5/2023 |
| WO | 2023090706 | A1 | 5/2023 |
| WO | 2023094389 | A1 | 6/2023 |

OTHER PUBLICATIONS

International Search Report for Application No. PCT/US2023/060333; mailed May 4, 2023; 4 pp.
International Search Report for Application No. PCT/US2023/076015; mailed Mar. 12, 2024; 4 pp.
International Search Report for Application No. PCT/US2024/020186; mailed Jun. 27, 2024; 3 pp.
International Search Report for Application No. PCT/US2023/066406; mailed Aug. 21, 2023; 5 pp.
International Search Report for Application No. PCT/US2023/074116; mailed Jan. 18, 2024; 5 pp.

* cited by examiner

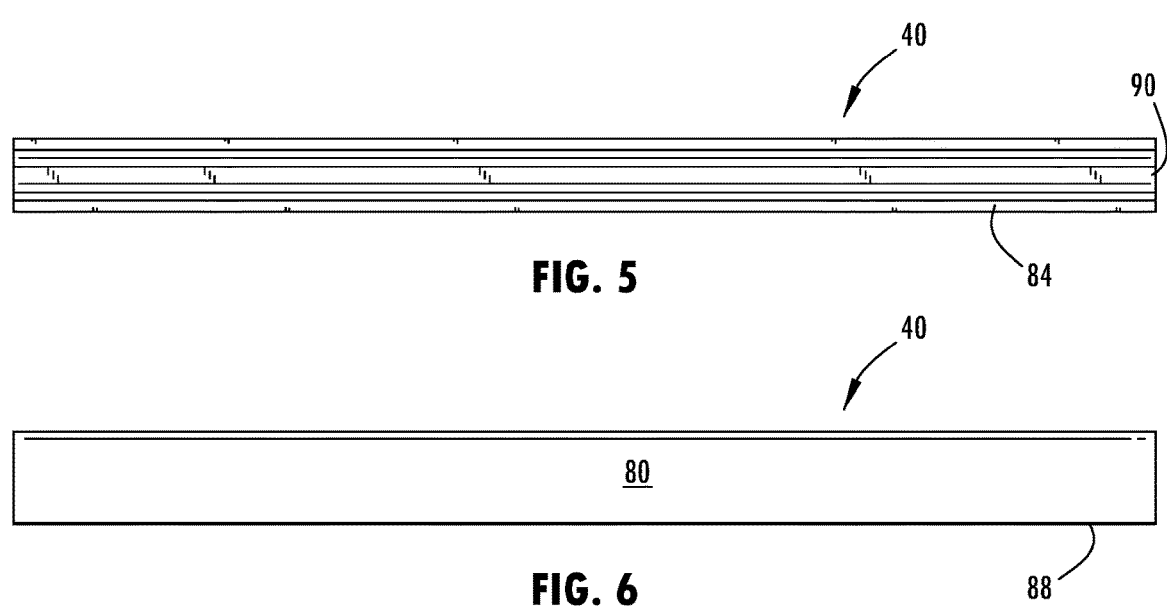
FIG. 5
FIG. 6
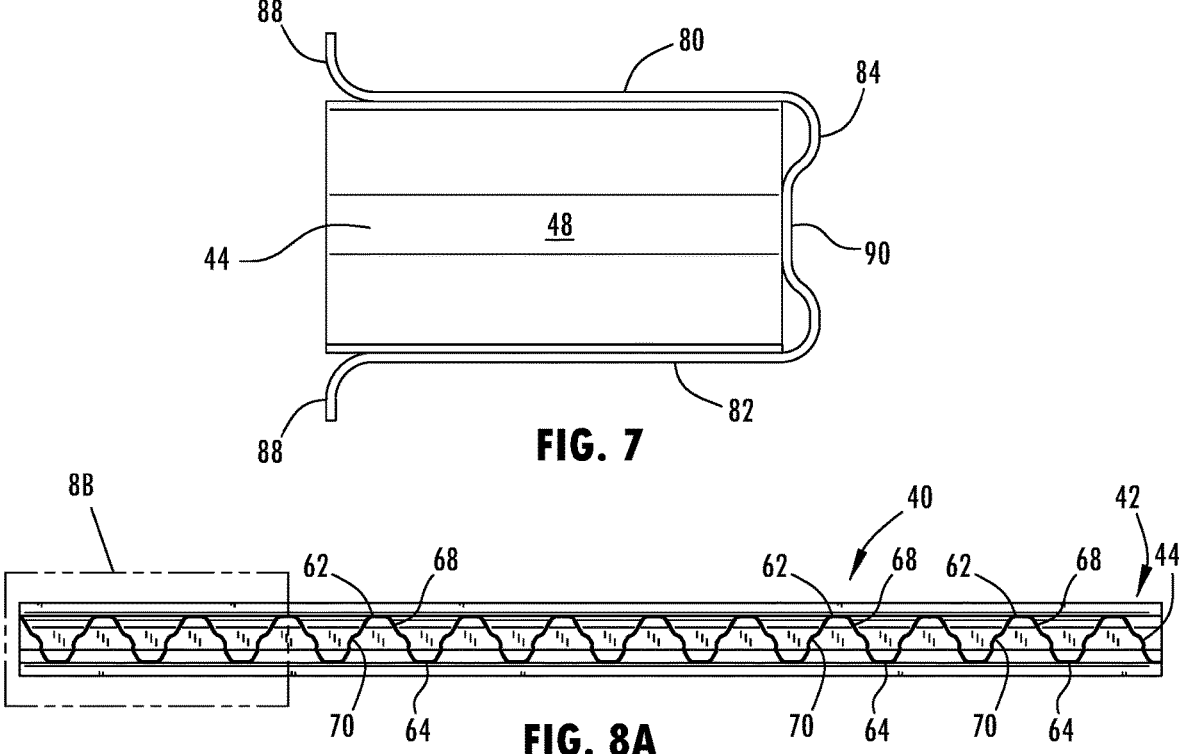
FIG. 7
FIG. 8A

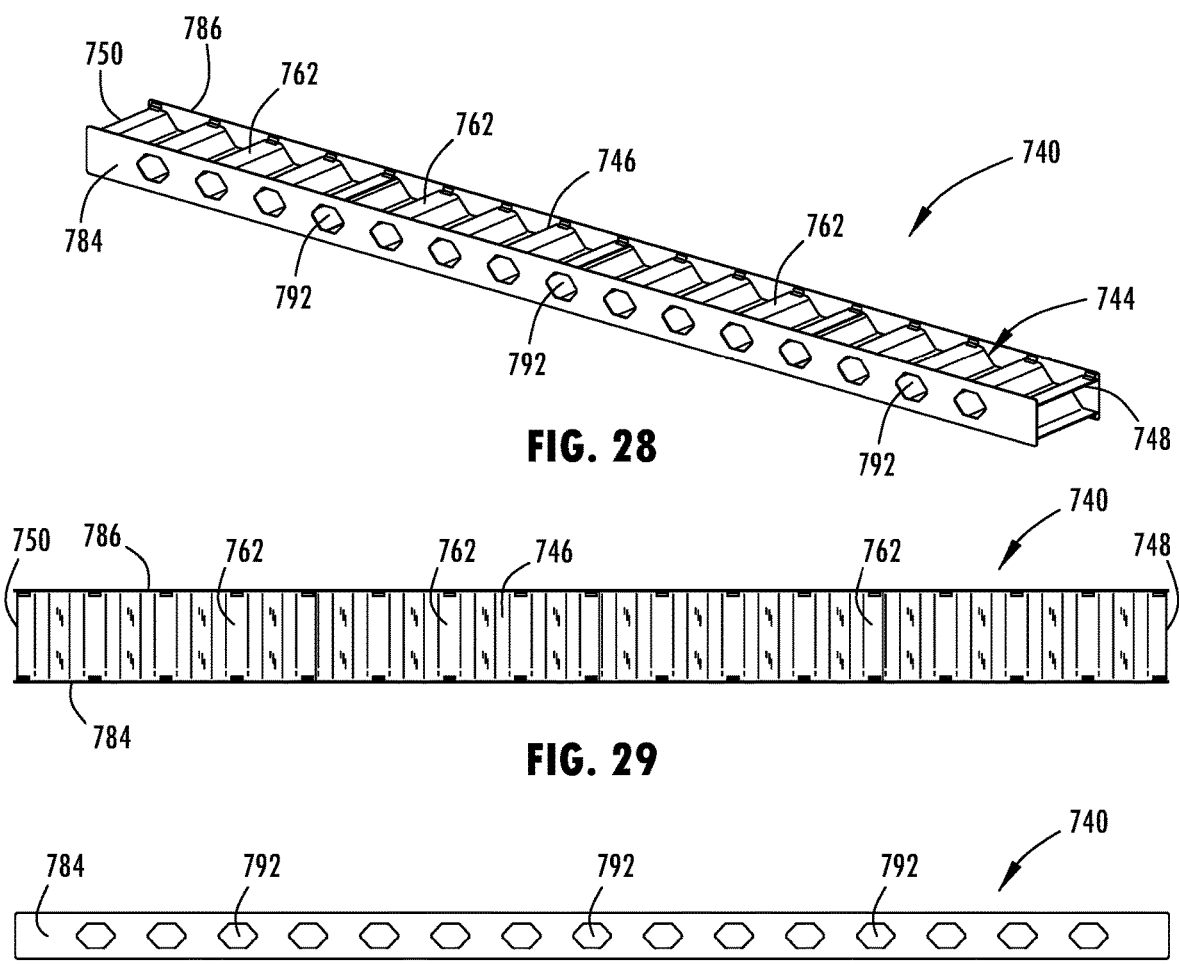
FIG. 28
FIG. 29
FIG. 30
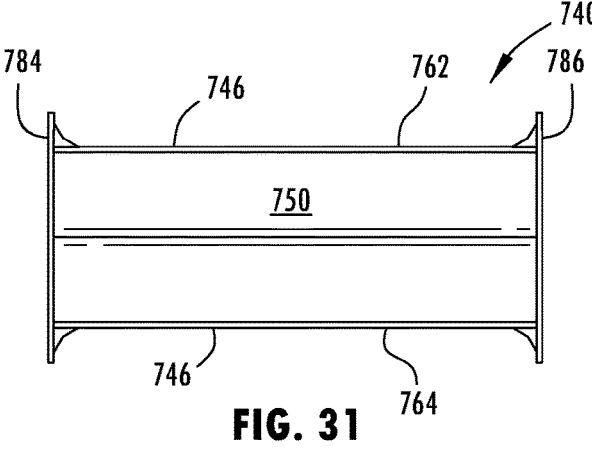
FIG. 31

ROCKER INSERT WITH WAVE-SHAPED STRUCTURE

CROSS-REFERENCE TO RELATED APPLICATION

This application claims benefit and priority under 35 U.S.C § 119(e) to U.S. Provisional Patent Application No. 63/269,927, filed Mar. 25, 2022, the disclosure of which is considered part of this application and is hereby incorporated by reference in its entirety.

TECHNICAL FIELD

The present disclosure relates to sill assemblies and more specifically to rocker inserts for vehicle body structures.

BACKGROUND

Vehicle frames and body structures are designed to support the vehicle and undergo and absorb certain levels of impact forces, such as to prevent distances of inboard intrusion into the vehicle in accordance with insurance requirements and other regulatory and legal requirements. Side impacts to a vehicle are commonly tested with side pole impact testing, which direct significant side impact forces to the vehicle. Vehicle frames primarily absorb these side impacts at rocker sections that run longitudinally between the front and rear wheels along the lower outboard portions of the vehicle frame.

With the incorporation of battery trays in electric and hybrid electric vehicles in the lateral inboard area between opposing rocker sections, it is desirable for the side impact forces to be directed away from the battery tray and towards a vehicle floor cross member. For example, it is generally known to increase stiffness of a vehicle sill assembly such as by adding a rocker insert within the vehicle sill assembly.

SUMMARY

The present disclosure provides a vehicle rocker assembly. Examples of the vehicle rocker assembly may include a sill structure that has a sill outer and a sill inner that define an elongated hollow interior between an inboard wall portion of the sill inner and an outboard wall portion of the sill outer. The vehicle rocker assembly includes a rocker insert that is configured to be disposed within the elongated hollow interior for stiffening the rocker structure to reduce lateral instruction as a result of side impacts to the vehicle, such as done in side pole impact test. The rocker insert includes a stiffening member that has a wave-shaped structure formed by at least one metal sheet. The wave shaped in the metal sheet includes alternating crest portions and trough portions disposed along the length of the rocker insert. The crest and trough portions of the wave-shaped structure extend between the inner edge and the outer edge of the metal sheet, so as to carry a side impact load path laterally between the sill inner and sill outer.

Implementations of the disclosure may include one or more of the following optional features. In some implementations, the crest and trough portions of the wave-shaped structure each have a continuous cross-sectional shape that extends laterally between the inner and outer edges of the metal sheet. In additional examples, the cross-sectional shapes of the crest portions and the trough portions are mirrored across the vertical height of the stiffening member. In some examples, the crest portion of the wave may include a flat or planar area at the center, which may be used to attach the stiffening member in the sill structure, such as via welding to a channel member or bracket or the like. In additional examples, the wave-shaped structure is comprised of a plurality of sheets coupled to one another in a longitudinal vehicle direction.

In some implementations, the rocker insert includes a channel member that has a top wall, a bottom wall, and a side wall connecting along the top and bottom walls to define a channel area, such that the stiffening member is disposed along the channel area. In some examples, the crest portions of the wave-shaped structure area attached at the top wall of the channel member. The channel member, in some examples, is coupled with the sill inner or the sill outer to support the rocker insert in the elongated hollow interior. For example, the rocker insert may further include one or more wall members that similarly attach along the stiffening member. In some implementations, the rocker insert includes a first side wall and a second side wall disposed parallel to one another and coupled to the inner edge and the outer edge of the metal sheet of the stiffening member.

In further implementations, the wave-shaped structure includes a second sheet defining a fore edge, an aft edge, a first side edge and a second side edge opposite the first side edge coupled to the first sheet, such that the fore edge and the aft edge of the second sheet are disposed in the same fore and aft location as the fore edge and the aft edge of the second sheet. In some examples, the crest portion of the first sheet is coupled to a trough portion of the second sheet.

In some implementations, a sheet thickness of the metal sheet is defined between upper and lower surfaces of the metal sheet that span between the inner and outer edges. In some examples, the upper surface faces upward in the sill structure and the lower surfaces faces downward in the sill structure. For example, the sheet thickness of the metal sheet may be 0.08-4.0 mm, or 0.7-0.75 mm, or 0.05-0.5 mm.

In some implementations, a rocker insert is disposed with a hollow interior of a sill assembly, the sill assembly including at least one of a sill outer having an outboard wall portion and a sill inner having an inboard wall portion defining the hollow interior. The rocker insert including a stiffening member defining a wave-shaped structure and comprising at least one sheet defining a fore edge, an aft edge, a first side edge and a second side edge opposite the first side edge. The fore edge and the aft edge are disposed at different locations along the length of the rocker insert. Additionally, a crest portion of the wave-shaped structure extends between the first side edge and the second side edge and is configured to carry a load path laterally between the inboard and outboard wall portions.

In some implementations, a vehicle rocker assembly includes a sill structure having an elongated hollow interior and a rocker insert disposed within the elongated hollow interior. The rocker insert includes a support member and a discontinuous stiffening member having a plurality of metal sheet spaced along the length of the support member. The plurality of metal sheets each include a wave-shaped structure with at least one crest portion and at least one trough portion alternating along the length of the metal sheet. The crest portion and the trough portion extend between inner and outer edges of the metal sheet.

In further implementations, a vehicle battery tray includes a side wall structure having an inboard wall portion and an outboard wall portion defining an elongated hollow interior there between. A stiffening insert is disposed within the elongated hollow interior. The stiffening insert includes a stiffening member having a metal sheet with a length extending along at least a portion of the elongated hollow interior. The stiffening member includes a wave-shaped structure with crest portions and trough portions alternating at spaced locations along the length of the metal sheet. The crest portions and the trough portions extend between inner and outer edges of the metal sheet and are configured to carry a load path laterally between the inboard and outboard wall portions of the side wall structure.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

FIG. 5 is a side view of the rocker insert shown in FIG. 4;

FIG. 6 is a top view of the rocker insert shown in FIG. 4;

FIG. 7 is an end view of the rocker insert shown in FIG. 4;

FIG. 8A is an opposite side view of the rocker insert shown in FIG. 4;

FIG. 28 is a perspective view of another example of the rocker insert;

FIG. 29 is a top view of the rocker insert shown in FIG. 28;

FIG. 30 is a side view of the rocker insert shown in FIG. 28;

FIG. 31 is an end view of the rocker insert shown in FIG. 28;

Like reference numerals indicate like parts throughout the drawings.

DETAILED DESCRIPTION

Figure 1:
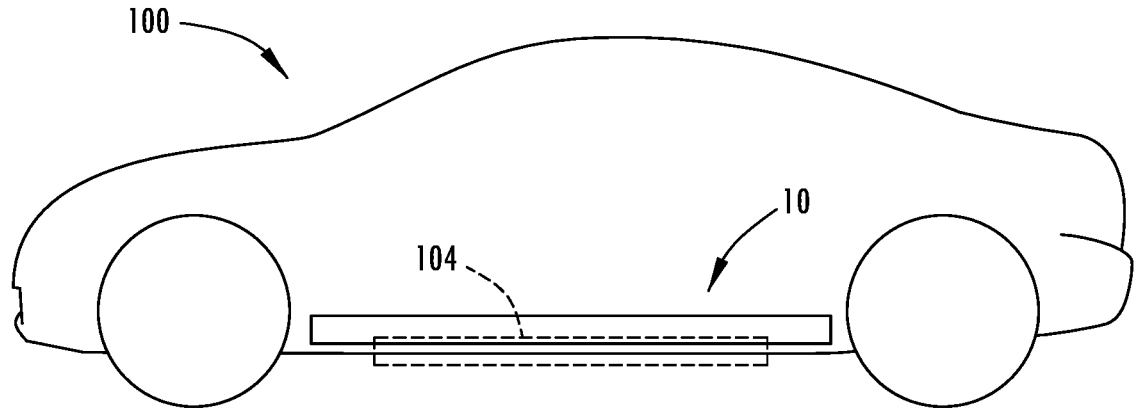
FIG. 1 is an side elevation view of a vehicle schematically showing a rocker assembly and a battery tray enclosure.
Figure 2:
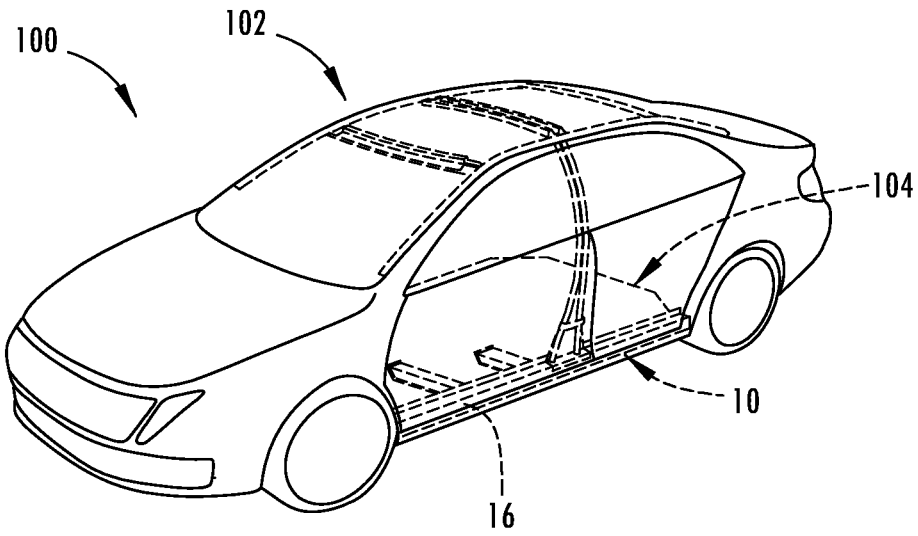
FIG. 2 is a perspective view of a vehicle schematically showing a rocker assembly and other structural components.

Referring now to the drawings and the illustrative embodiments depicted therein, a rocker assembly is provided for a vehicle 100, such as for a body structure or frame 102, as shown in FIGS. 1 and 2. The vehicle frame 102 and associated components may have various designs and configurations, such as for different styles and types of vehicles. As shown for example in FIGS. 1 and 2, the vehicle frame 102 has various structural component, including a B-pillar, a hinge pillar, a floor cross-member, a roof bow, and a header, among other structural components that support the body of the vehicle and protect passengers, engine components, and sensitive electronics from damage when undergoing collisions. In some examples, the vehicle 100 may be operated by a propulsion system that uses a battery, such as a battery or battery modules that may be supported in a battery tray 104 generally located between the axles and below the floor 109 to distribute the battery weight and establish a low center of gravity for the vehicle.

Figure 3:
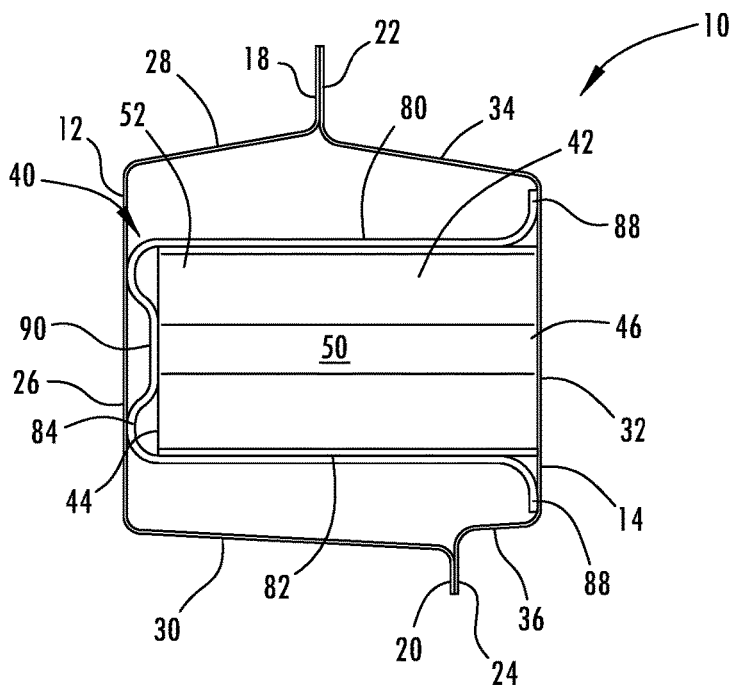
FIG. 3 is a cross-sectional view of an example of a vehicle rocker assembly including a rocker insert.

The vehicle rocker component includes a sill panel or panels, such as a sill inner 12 and sill outer 14 that attach together around an interior area 16, where the terms "inner" and "outer" are made in reference to inboard or inward facing and outboard or outward facing directions on the vehicle, such oriented in FIG. 1. As shown in FIGS. 2 and 3, the example of the vehicle rocker assembly 10 is provided with a reinforcement insert disposed in the interior area 16 to form a multi-tubular rocker structure. The rocker assembly 10 shown in FIG. 2 is disposed alongside an outer section of a battery tray 104 with the floor cross-member being attached to the vehicle rocker assembly 10 so as to span laterally over the battery tray 104. Accordingly, the vehicle component in additional implementations may also or alternatively be provided as a battery tray frame component, such as a longitudinally oriented side wall section of the battery tray.

When designing the vehicle rocker assembly with a rocker insert disclosed herein, the outer dimensions of the vehicle rocker assembly may be reduced and the overall weight of the vehicle rocker assembly may be reduced while meeting the required impact and loading conditions. The rocker insert may span a partial section of the vehicle rocker assembly or the entire length of the rocker assembly, such as to extend beyond the rocker assembly into and to also reinforce an adjacent component. The rocker insert disclosed herein may comprise the entire vehicle component or may be joined to additional reinforcements or parts of the vehicle component, such as at desired sections of the vehicle component. Further, in some examples the rocker assembly may be embodied as a subassembly or as part of a corresponding vehicle component, such as a structural component or a battery tray component and as such may be designed to undergo various impact forces and to support and sustain different loading conditions.

Moreover, the rocker insert disclosed herein may be formed with one or more pieces of sheet material to provide the structure with a relatively high strength (for shear and axial loading) and low weight in comparison to common rocker panels, such as to allow the still panels of the corresponding vehicle component (if provided) to use less material, occupy a smaller packaging space, and have greater flexibility in the outer shape design. The cross-sectional shape of different examples of the vehicle component and rocker insert may include various shapes and thicknesses for the desired application of the vehicle component.

Unless specified to the contrary, it is generally understood that additional implementations of the rocker component may have an opposite orientation from the examples shown and described, such as where the sill panels identified as a sill inner may be used as the sill outer and likewise the sill panels identified as a sill outer may be used as the sill inner. Further, in some examples, the cross-sectional shape of the inner and outer sill panels may vary along the rocker, such as, for example, by flaring outward at the ends.

Referring now to the vehicle rocker assembly 10 shown in FIG. 3, a first sill panel 12 and a second sill panel 14 are attached together to surround a hollow interior space 16 between the sill panels 12, 14. The vehicle rocker assembly 10 shown in FIG. 3 is embodied as a vehicle rocker component. Accordingly, the first sill panel 12 may be referred to as a sill inner of a rocker component. The first sill panel 12 has an upper flange 18 and a lower flange 20 that extend along respective upper and lower edges of the inner panel. The first sill panel 12 protrudes inboard from the upper and lower flanges 18, 20 to form outward facing concave structures. The second sill panel 14, which may be referred to as a sill outer of a rocker component, has a C-shaped cross section with flanges 22, 24, which may similarly be referred to as an upper flange 22 and a lower flange 24. The upper flanges 18, 22 and the lower flanges 20, 24 of the inner and outer sill panels 12, 14 are attached together, such as via welding, with the concave structures facing each other. The upper and lower flanges 18, 20, 22, 24 of each of the sill panels 12, 14 shown in FIG. 3 extend longitudinally and continuously along the edges of the rocker assembly 10. It is also contemplated that in some examples the flanges may be trimmed away in select areas to facilitate attachment to the frame or other components or to otherwise reduce weight or the like.

As further shown in FIG. 3, the inner and outer sill panels 12, 14 are joined together to define an elongated hollow interior 16 between the sill panels 12, 14. The upper and lower flanges 18, 20, 22, 24 are substantially planar and oriented in a generally vertical configuration, such as to mate in generally continuous contact along the length of the component. The upper and lower flanges 18, 20, 22, 24 may be joined together via welding, and preferably spot welding, although it is conceivable that alternative welding methods or joining means may be used in addition or in the alternative to spot welding in different implementations of a rocker component, such as adhesive or fasteners or the like.

The first sill panel 12, or sill inner of the vehicle rocker assembly 10, has an inboard wall portion 26 that is substantially planar. The inboard wall portion 26 integrally interconnects with a corner transition to an upper wall portion 28 and a lower wall portion 30 at the respective upper and lower ends. The corner transitions are approximately 90 degrees between the inboard wall portion 26 and the upper and lower wall portions 28, 30. Also, the corner transitions are defined by the longitudinal bends to a sheet material that forms the first sill panel 12, such as a metal sheet (e.g., an advanced high strength steel sheet or aluminum sheet). Similarly, the upper and lower wall portions 28, 30 each have a corner transition of approximately 90 degrees to the upper flange 18 and the lower flange 20, respectively. The corner transitions are also defined by longitudinal bends in the sheet material of the first sill panel 12, such as formed by a roll form process. As also shown in FIG. 3, the upper and lower flanges 18, 20 are substantially planar and oriented in parallel alignment with the planar extent of the inboard wall portion 26. The upper and lower wall portions 28, 30 of the first sill panel 12 are also substantially planar and, as shown in FIG. 3, are substantially parallel to each other, although in additional examples they may be slightly angled from each other. The corner transitions may also have an angular transition greater or less than shown in FIG. 3, such as approximately between 40 and 120 degrees, between 70 and 100 degrees, between 80 and 95 degrees, or between 82 and 92 degrees.

As also shown in FIG. 3, the second sill panel 14 or sill outer of the vehicle rocker assembly 10 has an outboard wall portion 32 that is substantially planar and integrally interconnects with an upper wall portion 34 and a lower wall portion 36 at its respective upper and lower ends. The corner transitions of approximately 80 degrees between the outboard wall portion 32 and the upper and lower wall portions 34, 36 are defined by longitudinal bends to a sheet material that forms the second sill panel 14. The sheet material may be the same or different from the first sill panel 12 and may include a metal sheet, such as an advanced high strength steel sheet or aluminum sheet. Similarly, the upper wall portion 34 also has a corner transition to the upper flange 22 and the lower wall portion 36 has a corner transition to the lower flange 24, which are each also defined by longitudinal bends in the sheet material of the second sill panel 14. Again, the corner transitions between the upper and lower wall portions 34, 36 and the upper and lower flanges 22, 24 and the outboard wall portion 32 may have an angular transition greater or less than shown in FIG. 4, such as approximately between 40 and 120 degrees, between 70 and 100 degrees, between 80 and 95 degrees, or between 82 and 92 degrees.

As shown in FIG. 3, the upper and lower flanges 22, 24 are substantially planar and oriented in parallel alignment with the planar extent of the outboard wall portion 32. The upper and lower wall portions 34, 36 of the second sill panel 14 are also substantially planar, but are slightly angled from being orthogonal to the outboard wall portion 32 and flanges 22, 24. With the flanges 18, 20, 22, 24 of the panels 12, 14 attached together, the walls thereof define a substantially hexagonal cross-sectional shape; however, it is appreciated that additional examples of the rocker insert may have various alternative cross-sectional shapes (e.g., a substantially rectangular shape) and different wall configurations for the corresponding vehicle design (e.g., portions of the inboard or outboard wall portions that are not vertically oriented). It is also contemplated that in other examples the sill outer and the sill inner may each include a different configuration including but not limited to the sill outer having an inward or outward protruding stiffening rib portion configured to provide additional stiffness and side impact support.

Figure 4:
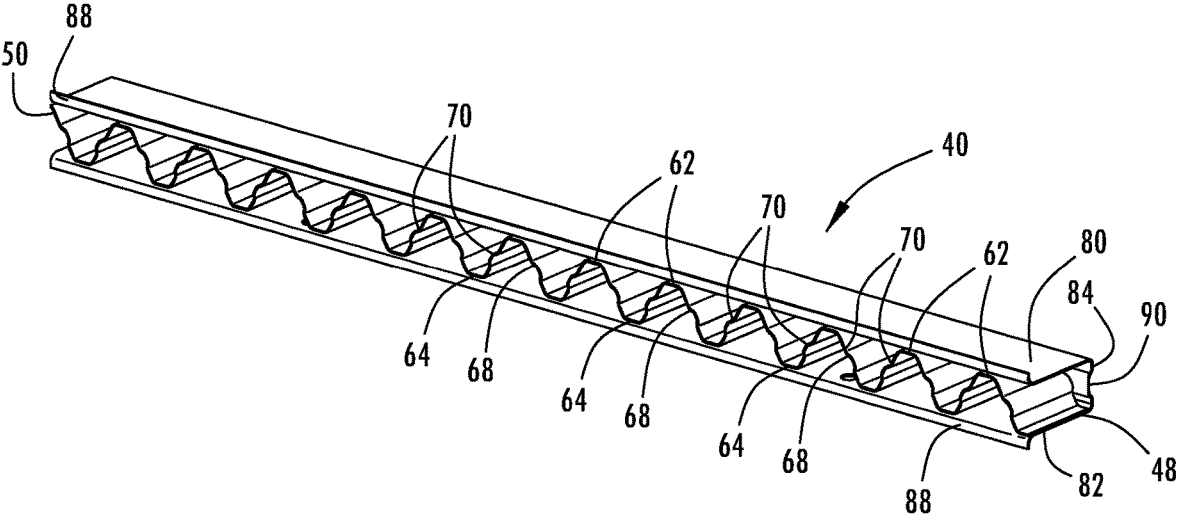
FIG. 4 is a perspective view of the rocker insert shown in FIG. 3.
Figure 8B:
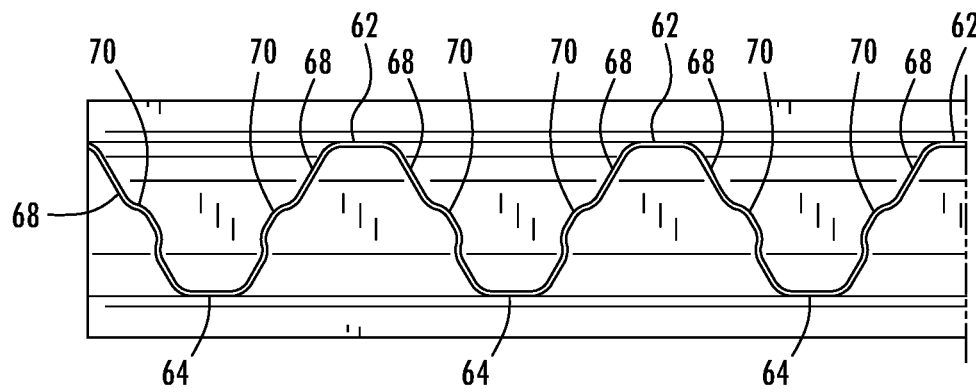
FIG. 8B is an enlarged view of the section indicated in FIG. 8A.
Figure 9A:
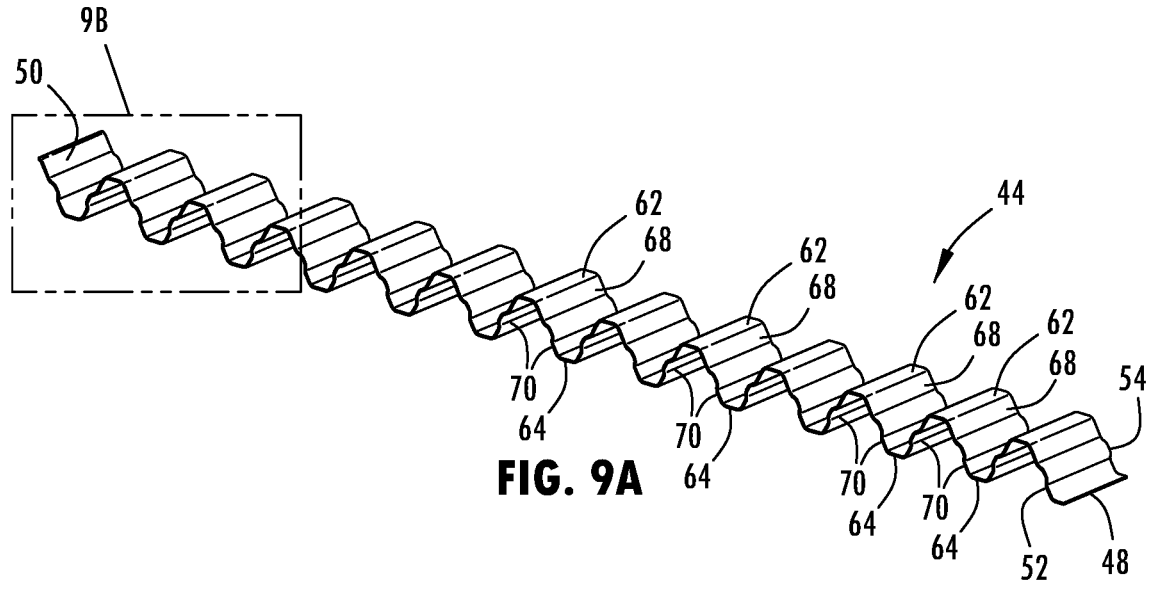
FIG. 9A is a perspective view of a wave-shaped structure of the rocker insert shown in FIG. 4.
Figure 9B:
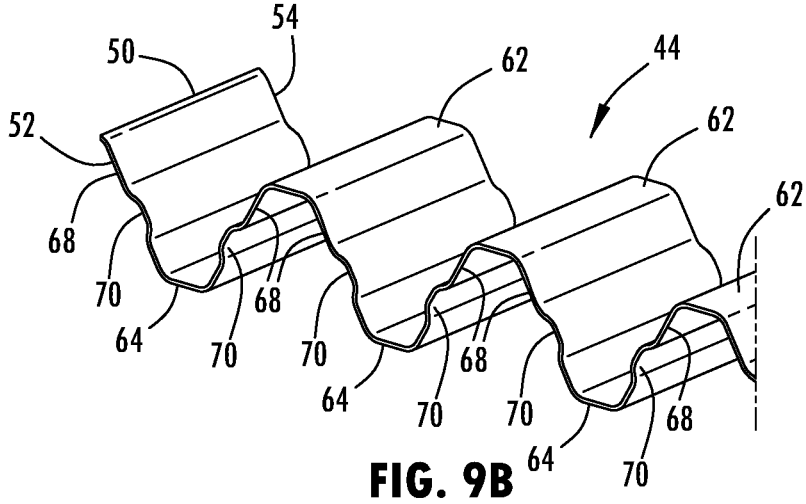
FIG. 9B is an enlarged view of the section indicated in FIG. 9A.

As further shown in FIGS. 3 and 4, the vehicle rocker assembly 10 includes a rocker insert 40 disposed within the elongated hollow interior 16. The rocker assembly 10 includes a stiffening member 42 defining a wave-shaped structure 44. The stiffening member 42 includes at least one sheet 46 defining a fore edge 48, an aft edge 50, a first side edge 52 and a second side edge 54 opposite the first side edge 52 (FIG. 9B). As further shown in FIG. 9B, the first and second side edges 52, 54 are disposed parallel to one another along a length of the rocker insert 40. In one example, the fore edge 48 and the aft edge 50 are disposed at different locations along the length of the rocker insert 40.

The at least one sheet 46 may formed from a flat metal sheet 46, such as coiled steel or aluminum, which is then cut and formed, such as via stamping, roll-forming, or other bending into the desired shape. It is also contemplated that the at least one sheet 46 may be comprised of another material having the desired strength requirements and/or from non-coiled steel or aluminum. In some examples, such as shown in FIGS. 3 and 4, the elongated metal sheet that forms the wave-shaped structure of the stiffening member 42 is a single sheet that extends along the length of the elongated hollow interior of the rocker assembly 10. The single sheet that forms the stiffening member 42 may be stamped, such as in a progressive stamping to repeat the alternating crest portions and trough portions along the length of the rocker insert. In additional examples, the metal sheet may be roll formed, such as in a lateral direction relative to the vehicle to form a consistent cross-sectional shape that is cut to multiple sheets segments to be repeated along the rocker insert, such as shown for example in FIGS. 41-43.

In some examples, the stiffening member 42 may include a plurality of sheets 46 coupled to one another in a longitudinal vehicle direction, each defining a fore edge 48, an aft edge 50, a first side edge 52, and a second side edge 54 opposite the first side edge 52. Moreover, the fore edge 48 and the aft edge 50 of each of the plurality of sheets 46 are disposed at different locations along the length of the rocker insert 40. Additionally, the wave-shaped structure 44 includes a second sheet 46 defining a fore edge 48, an aft edge 50, a first side edge 52 and a second side edge 54 opposite the first side edge 52 coupled to the first sheet 46 such that the fore edge 48 and the aft edge 50 of the second sheet 46 are disposed in the same fore and aft location as the fore edge 48 and the aft edge 50 of the second sheet 46. In one example, the crest portion 62 of the first sheet is coupled to crest portion 62 of a second sheet, however, various other configurations have been contemplated, such as joining the crest portion to the adjacent trough or trough portion, such as at a lap joint at the vertical center of the wave shape of the stiffening member. In one example the first sheet 46 and the second sheet 46 are coupled by welding however, various other coupling methods have been contemplated including but not limited to the use of fasteners and/or adhesive.

Referring again to the example shown in FIGS. 3 and 4, a cross-sectional shape of the wave-shaped structure 44 comprises a wave shape with a series of crests or crest portions that extend in parallel with each other and laterally on the stiffening member relative to the longitudinal extent of the rocker assembly 10. The wave-shaped structure 44 includes a crest portion 62 defined as a highest point or portion of the wave-shaped structure 44 and may also include surrounding portions thereof. The wave-shaped structure 44 also includes a trough or trough portion 64 defined as a lowest point or portion of the wave-shaped structure 44 and may also include surrounding portions thereof. Accordingly, for purposes of this disclosure, a wave-shaped structure includes at least two crest portions or at least two trough portions, such as to have a full wave-length. The wave shaped structure 44 is further defined by the crest portions 62 alternating with the through portions 64. In one example, the crest portion 62 of the wave-shaped structure 44 extends between the first side edge 52 and the second side edge 54 and is configured to carry a load path laterally between the inboard and outboard wall portions. In other words, the crest portion 62 of the wave-shaped structure 44 extends at least partially between the sill inner and the sill outer, if included. As shown in the example illustrated in FIGS. 3 and 4, the trough portion 64 of the wave-shaped structure 44 also extends between the first side edge 52 and the second side edge 54 and is configured to carry a load path laterally between the inboard and outboard wall portions.

The lateral vehicle direction generally extends across the width dimension of the vehicle. In contrast, the longitudinal vehicle direction generally extends along the length dimension of the vehicle. In some examples, the crest portion 62 may be disposed in a generally horizontal plane. The crest portions 62 and trough portions 64 of the wave-shaped structure 44 are configured to be oriented to generally align with anticipated lateral impacts to the side of a vehicle, so as to provide increased stiffness to the corresponding portion of the upper or lower wall F of the rocker insert 40 40. Moreover, the crest portions 62 and trough portions 64 of the wave-shaped structure 44 extend at least partially between the sill wall portions of the sill inner 12 and the sill outer 14. In some examples the wave-shaped structure 44 may extend across an entire surface or may be disposed on only a portion of the surface. The crest portions 62 and the trough portions 64 may be of any shape and side as desired, including but not limited to the crest and trough portions 62, 64 being a v-shape or a u-shape. The crest portions 62 and the trough portions 64 may also include more than the highest or lowest point on the sheet, such that these portions may include a section of the sheet that include formations on the upper or lower surfaces, such as laterally extending channels or the like. It is also contemplated that the crest portions 62 and the trough portions 64 may be the same shape, such as a mirrored shape across the vertical central of the wave shape, or may be different shapes than one another, such as shown in FIGS. 22-27. Moreover, it is contemplated that the crest portions 62 and/or the trough portions 64 may be a single repeating shape, may be alternating shapes, or any pattern as desired.

In some examples, a height of the crest portion 62 is the same as the depth of the lowest point on the trough portion 64. However, it is also contemplated that the height of the crest 62 and the depth of the lowest point on the trough 64 may be different than one another such that the height of the crest 62 is larger than the depth of the trough 64 or vice versa. Additionally, the heights of the crests 62 may remain constant along the wave-shaped structure 44, such as shown in FIGS. 3-9B. However, it is also contemplated that the height of the crests 62 may be variable along the wave-shaped structure 44. Similarly, the depth of the trough 64 may remain constant along the wave-shaped structure 44, such as shown in FIGS. 3-9B. However, it is also contemplated that the depth of the trough 64 may be variable along the wave-shaped structure 44.

In some examples, a width of the crest 62 is the same width as the trough 64. However, it is also contemplated that the width of the crest 62, measured from a center of one trough 64 to the center of an adjacent trough 64, and the width of the trough 64, measured from one crest 62 to another crest, may be different than one another such that the width of the crest 62 is larger than the width of the trough 64 or such that the width of the trough 64 is larger than the width of the crest. Moreover, it is contemplated that the width of the crests 62 may remain constant along the length of the wave-shaped structure 44. However, it is also contemplated that the width of the crest 62 may be variable along the wave-shaped structure 44. Similarly, it is contemplated that the width of the troughs 64 remain constant along the length of the wave-shaped structure 44. However, it is also contemplated that the width of the trough 64 may be variable along the wave-shaped structure 44.

In the example shown in FIGS. 3 and 4, the cross-sectional shape begins at the crest 62 which is a generally flat surface. The wave-shaped portion then turns into an angled portion 68 which extends downwards at an angle before reaching the trough 64 which is another generally flat surface. Another angled portion 68 extends from the flat surface of the trough 64 upwards towards a second crest. In the examples shown, the angled portion 68 extends at approximately a 45 degree angle however other angles have been completed from 15-105 degrees. The angled portion 68 provides a shape such that a distance between a first trough 64 and a second trough 64 is larger than a length of the crest. Similarly, the distance between a first crest 62 and a second crest 62 is larger than a length of the trough. As shown in the example illustrated in FIGS. 3 and 4, this shape is then repeated in a pattern throughout the length. However, various other shapes have been contemplated. Additionally, the angled portion 68 between trough 64 and crest 62 may include one or more reinforcement ribs 70 which are configured to provide additional strength to the wave-shaped portion. In the example shown, the transitions between the angled portion 68 and the crest 62/trough 64 and near the reinforcement rib 70 are curved angles, however, various other configurations have been contemplated including more sharp angled transitions.

The rocker insert 40 may also a support or channel member that include includes at least two of a top wall 80, a bottom wall 82, a first side wall 84, and second side wall 86. In the example shown in FIGS. 3 and 4, the rocker insert 40 includes a channel member with the top wall 80, the bottom wall 82 disposed generally parallel to the top wall 80, and a first side wall 84 which extends between the top wall 80 and the bottom wall 82, such as to form a C-shaped channel. In one example, the top wall 80 and the bottom wall 82 are generally flat parallel extending surfaces, however various other implementations have been contemplated including corrugation disposed on one or more of the top wall 80 and the bottom wall 82. In the example shown, the top wall 80 and the bottom both have flange portions 88 which extend at an angle from the top wall 80 and the bottom wall 82. The angle between the flange and the top or bottom wall 82 may be approximately ninety degrees, however, various other angles have been contemplated including but not limited to angles in the 25-125 degree range. The flange portions 88 are configured to allow the rocker insert 40 to be coupled to another vehicle component such as a sill inner, a sill outer, or other vehicle component.

Moreover, in the example shown, the side wall curved outward from both the top surface and the bottom surface before curving back inwards, towards the wave-shaped portion, and meeting at a recessed portion 90. In some examples, the recessed portion 90 is curved such that it has a generally u-shape, however various other shapes have been contemplated. In some examples, one or more of the top wall 80 or the bottom wall 82 may include cut-outs to accommodate other vehicle components without departing from the spirit of the invention.

Referring still to the example shown in FIGS. 3 and 4, it is contemplated that one of the side wall and or the flange portions 88 of the top and bottom wall 82 may be coupled to one of the inner sill or the outer sill to support the rocker insert 40 in the elongated hollow interior 16. Again, this coupling may be through welding, however, other coupling methods have been contemplated including but not limited to the use of fasteners or adhesive. In one example, the side wall is coupled to the inner sill. In another example, the side wall is coupled to the outer sill. In another example, the flange portions 88 of the top and/or bottom wall 82 are coupled to the outer sill. In another example, the flange portions 88 of the top and/or bottom wall 82 are coupled to the inner sill.

It is also contemplated, as described above, that the crest 62 and trough 64 of the wave-shape portion may be coupled to the top and bottom walls 80, 82, respectively. Typically, this coupling is joined by welding, however, other processes have been contemplated including but not limited to fasteners or adhesive.

The stiffening member and the support or channel member may be formed with a metal sheet material, such as a high strength steel sheet. The sheet thickness of the metal sheet is defined between upper and lower surfaces of the metal sheet that span between the inner and outer edges. In some examples, the upper surface faces upward in the sill structure and the lower surfaces faces downward in the sill structure. For example, the sheet thickness of the metal sheet may be 0.08-0.4 mm, or 0.07 mm to 0.2 mm, or 0.08-0.4 mm, or 0.08-0.18 mm, or 0.12-0.16 mm, or 0.08-4.0 mm, or 0.01-0.75 mm, or 0.05-0.5 mm.

Figure 10:
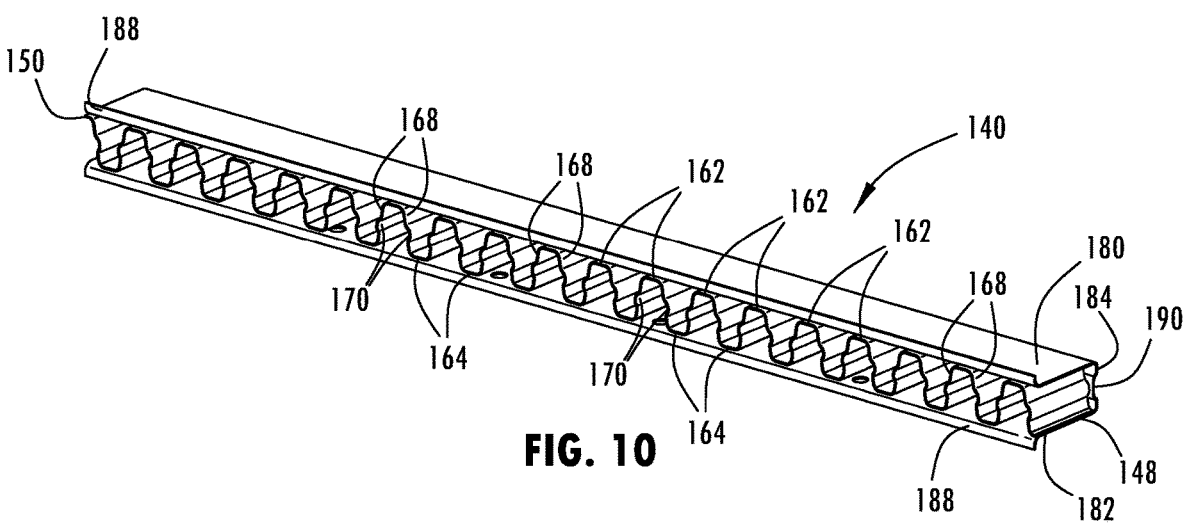
FIG. 10 is a perspective view of another example of the rocker insert.
Figure 11:
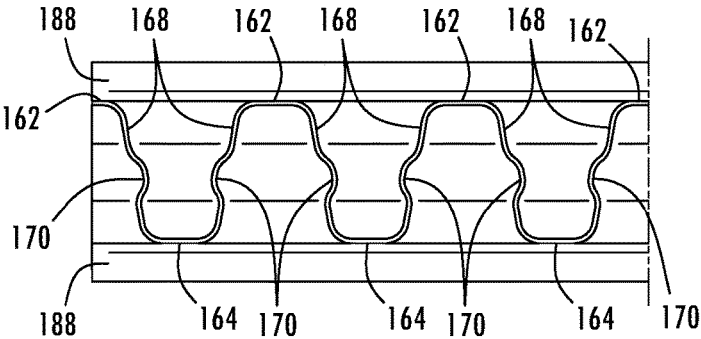
FIG. 11 is an enlarged side view of the rocker insert shown in FIG. 10.
Figure 12:
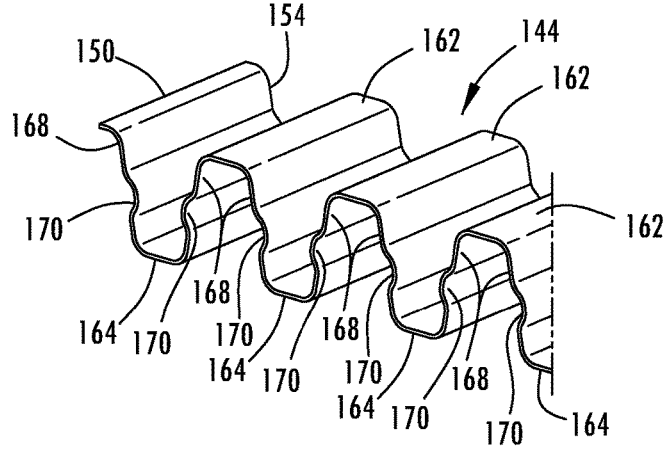
FIG. 12 is an enlarged perspective view of the wave-shaped structure of the rocker insert shown in FIG. 10.

Referring now to the example shown in FIGS. 10-12, the rocker assembly 110 includes similar features to the features described above with respect to the rocker assembly 10 shown in FIGS. 1-9B, including but not limited to the one more of the sill outer 114 or sill inner 112, and the rocker insert 140 including the top wall 180, the bottom wall 182, and the side wall 184 along with the stiffening member 142 defining the wave-shaped structure 144 including the sheet 146 with the fore edge 148 and the aft edge 150 disposed at different locations along the length of the rocker insert 140. However, as illustrated in the example shown in FIGS. 10-12, the angled portions 168 of the wave-shaped structure 144 extend at a smaller degreed angle than the example shown in FIGS. 1-9B. More specifically, the angled portions 168 of the wave-shaped structure 144 extend at an angle slightly greater than 90 degrees, for example in the 95-105 degree range, such that the distance between the first crest 162 and the second crest 162 is only slightly larger than the width of the trough 164. Similarly, as best shown in FIG. 11, the distance between the first trough 164 and the second trough 164 is only slightly larger than the width of the crest 162.

Figure 13:
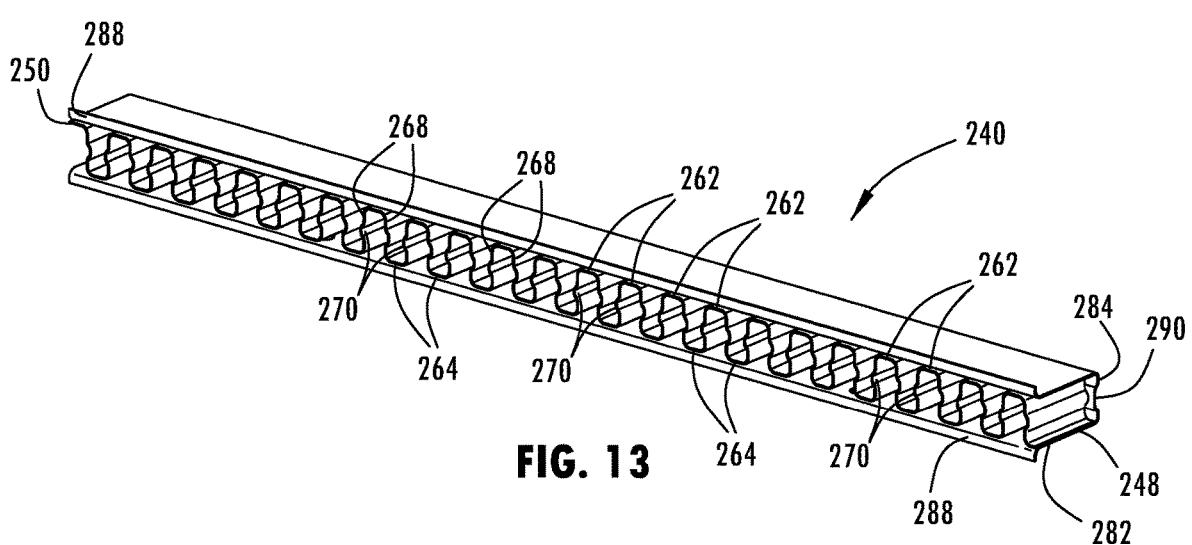
FIG. 13 is a perspective view of another example of the rocker insert.
Figure 14:
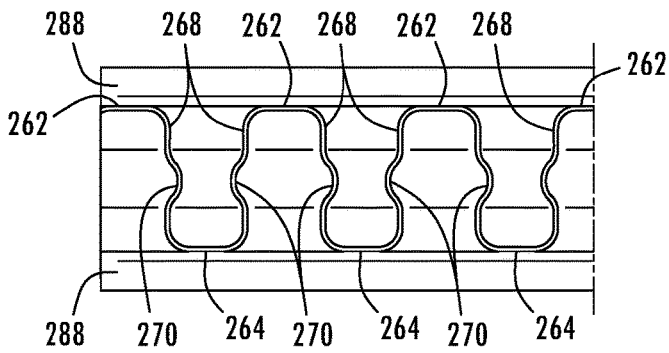
FIG. 14 is an enlarged side view of the rocker insert shown in FIG. 13.
Figure 15:
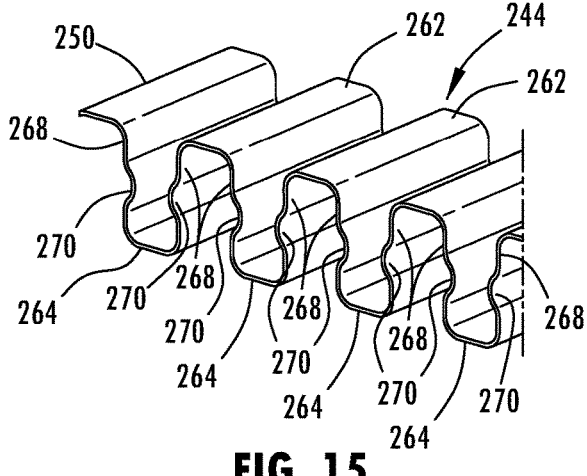
FIG. 15 is an enlarged perspective view of the wave-shaped structure of the rocker insert shown in FIG. 13.

Referring now to the example shown in FIGS. 13-15, the rocker assembly 210 includes similar features to the features described above with respect to the rocker assembly 10 shown in FIGS. 1-9B, including but not limited to the one more of the sill outer 214 or sill inner 212, and the rocker insert 240 including the top wall 280, the bottom wall 282, and the side wall 284 along with the stiffening member 242 defining the wave-shaped structure 244 including the sheet 246 with the fore edge 248 and the aft edge 250 disposed at different locations along the length of the rocker insert 240. However, as illustrated in the example shown in FIGS. 10-12, the angled portions 268 of the wave-shaped structure 244 extend at a generally 90 degree angle before reaching the reinforcement rib 270 and then continuing the extend approximately perpendicular to the crest 262 and the trough 264. As such, the distance between the first crest 262 and the second crest 262 is approximately equal to the width of the trough 264. Similarly, as best shown in FIG. 11, the distance between the first trough 264 and the second trough 264 is approximately equal to than the width of the crest 262.

Figure 16:
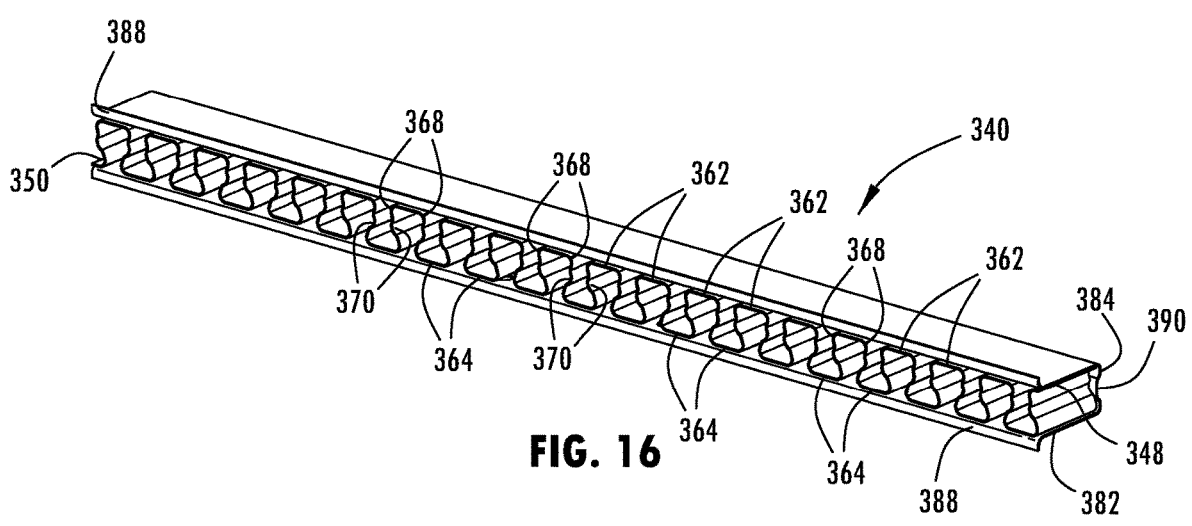
FIG. 16 is a perspective view of another example of the rocker insert.
Figure 17:
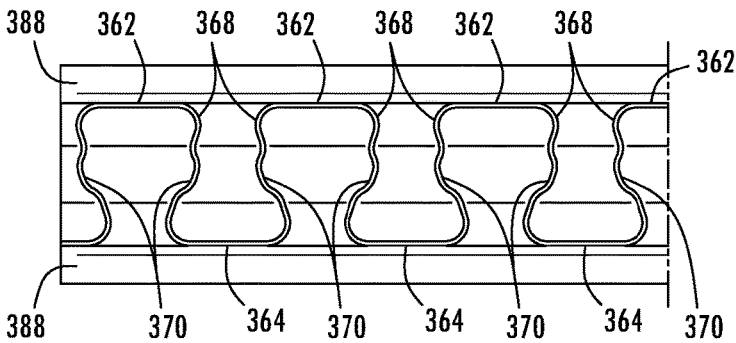
FIG. 17 is an enlarged side view of the rocker insert shown in FIG. 16.
Figure 18:
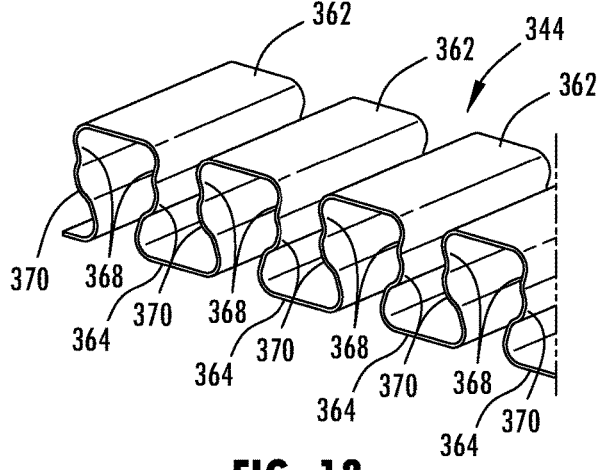
FIG. 18 is a close up perspective view of the wave-shaped structure of the rocker insert shown in FIG. 16.
Figure 19:
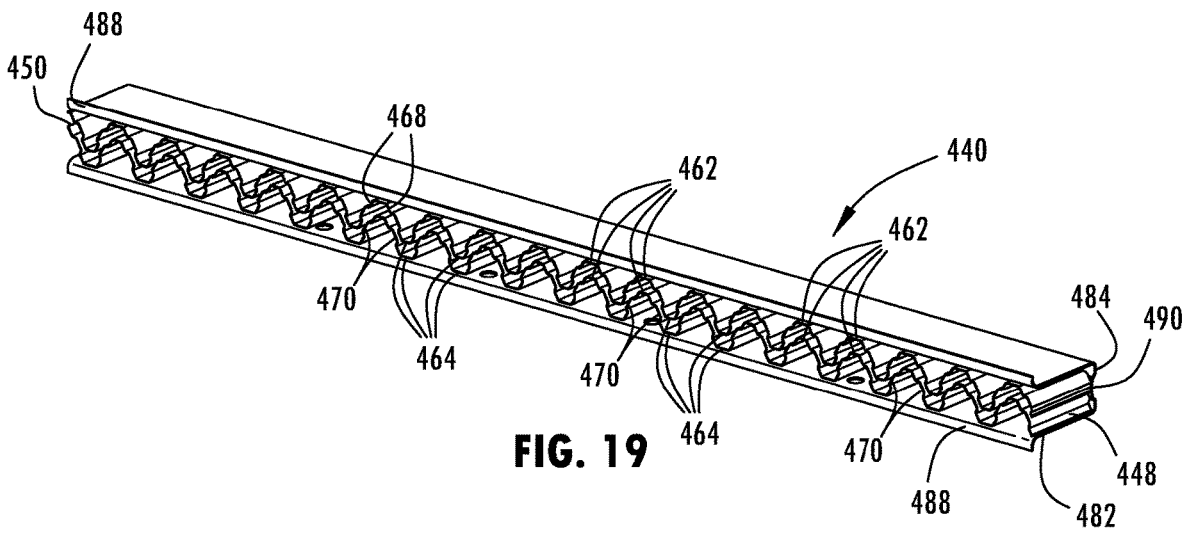
FIG. 19 is a perspective view of another example of the rocker insert.
Figure 20:
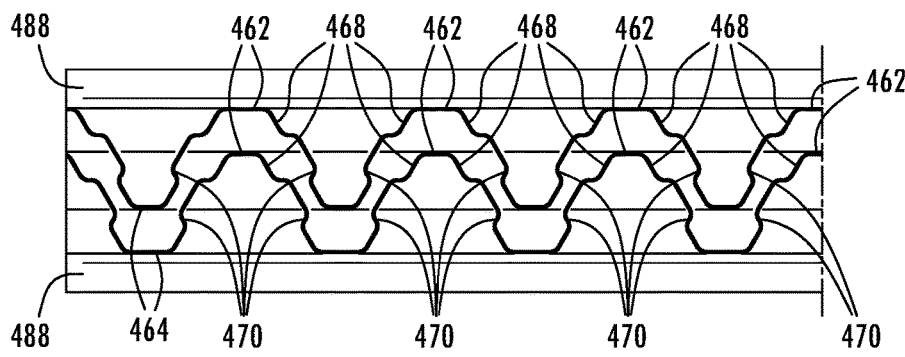
FIG. 20 is an enlarged side view of the rocker insert shown in FIG. 19.
Figure 21:
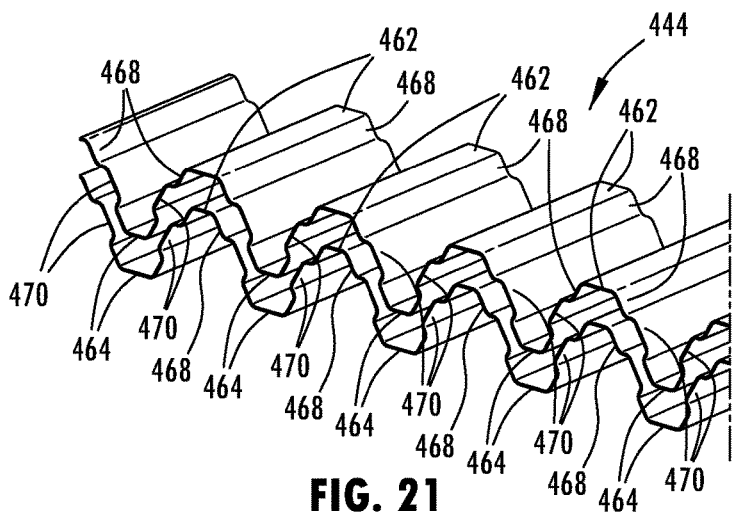
FIG. 21 is an enlarged perspective view of the wave-shaped structure of the rocker insert shown in FIG. 19.

Referring now to the example shown in FIGS. 16-18, the rocker assembly 310 includes similar features to the features described above with respect to the rocker assembly 10 shown in FIGS. 1-9B, including but not limited to the one more of the sill outer 314 or sill inner 312, and the rocker insert 340 including the top wall 380, the bottom wall 382, and the side wall 384 along with the stiffening member 342 defining the wave-shaped structure 344 including the sheet 346 with the fore edge 348 and the aft edge 350 disposed at different locations along the length of the rocker insert 340. However, as illustrated in the example shown in FIGS. 10-12, the angled portions 368 of the wave-shaped structure 344 extend at a generally 90 degree angle from the crest 362 before reaching the reinforcement rib 370 and then continuing inward from the reinforcement rib 370 and extending at an angle towards the crest 362. As such, the distance between the first crest 362 and the second crest 362 is less than the width of the trough 364. Similarly, as best shown in FIG. 11, the distance between the first trough 364 and the second trough 364 is less than the width of the crest 362.

Referring now to the example shown in FIGS. 19-22, the rocker assembly 410 includes similar features to the features described above with respect to the rocker assembly 10 shown in FIGS. 1-9B, including but not limited to the one more of the sill outer 414 or sill inner 412, and the rocker insert 440 including the top wall 480, the bottom wall 482, and the side wall 484 along with the stiffening member 442 defining the wave-shaped structure 444 including the sheet 446 with the fore edge 448 and the aft edge 450 disposed at different locations along the length of the rocker insert 440. Additionally, the wave-shaped structure 444 is similar in shape to the shape described with respect to the example shown in FIGS. 1-9B. However, the stiffening member 42 includes a second waved shaped structure having an identical shape disposed within the interior. In this example, the crest 462 of the first wave-shaped structure 444 is coupled to the top wall 80 of the stiffening member 444. Additionally, the trough 464 of the second wave-shaped structure 444 is coupled to the bottom wall 482 of the stiffening member 442. As additionally shown in FIGS. 19-24, the reinforcement ribs 470 may have a more angular shape rather than the more curved shape shown in the example in FIGS. 1-9B. Moreover, it is contemplated that the reinforcement ribs 470 may be disposed on the angled portion at a location which is closer to the crest 462 or closer to the trough 464, as desired.

Figure 22:
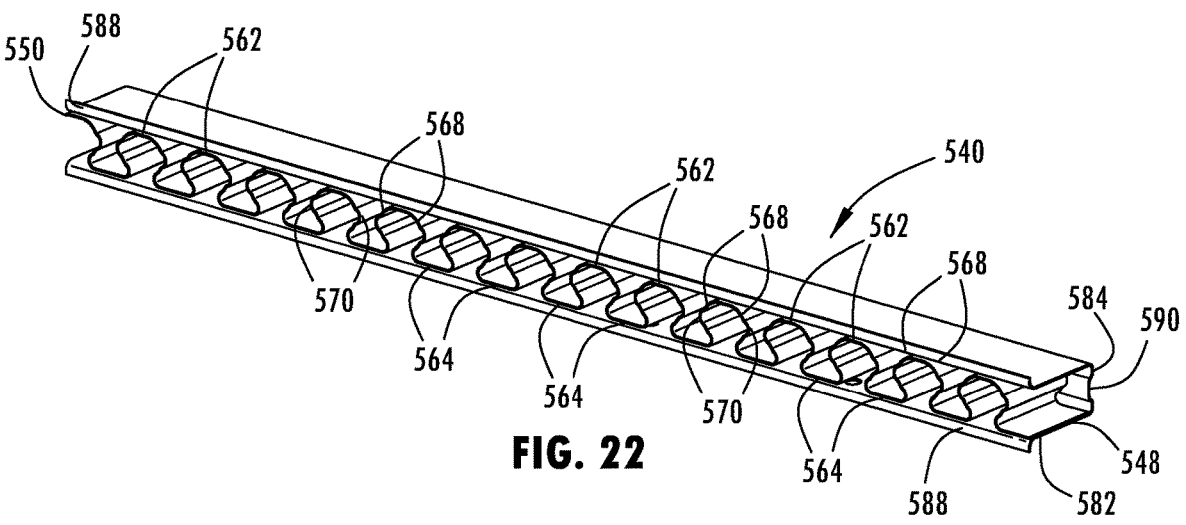
FIG. 22 is a perspective view of another example of the rocker insert.
Figure 23:
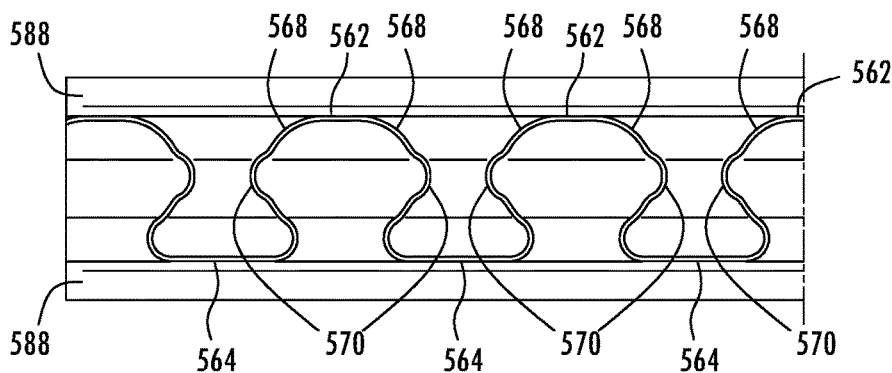
FIG. 23 is an enlarged side view of the rocker insert shown in FIG. 22.
Figure 24:
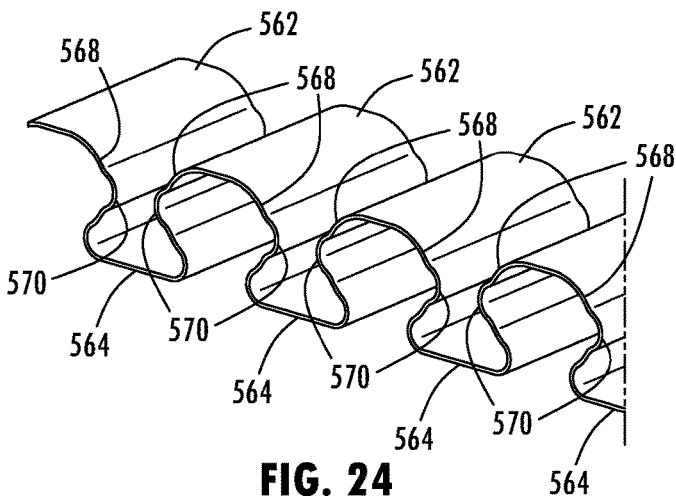
FIG. 24 is an enlarged perspective view of the wave-shaped structure of the rocker insert shown in FIG. 22.

Referring now to the example shown in FIGS. 22-24, the rocker assembly 510 includes similar features to the features described above with respect to the rocker assembly 10 shown in FIGS. 1-9B, including but not limited to the one more of the sill outer 554 or sill inner 552, and the rocker insert 540 including the top wall 580, the bottom wall 582, and the side wall 584 along with the stiffening member 542 defining the wave-shaped structure 544 including the sheet 546 with the fore edge 548 and the aft edge 550 disposed at different locations along the length of the rocker insert 540. However, as illustrated in the example shown in FIGS. 22-24, the angled portions 568 of the wave-shaped structure 544 extend at a greater angle than shown in FIGS. 1-9B. The angle of extension is greater than 90 degrees and may be in the range of 95-130 degrees. Additionally, once the reinforcement rib 570 is reached, the angled portion 568 extends back at a similar angle towards the trough 564. As such, the distance between the first crest 562 and the second crest 562 is approximately equal to the width of the trough 564. Similarly, as best shown in FIG. 23, the distance between the first trough 564 and the second trough 564 is approximately equal to than the width of the crest 562.

Figure 25:
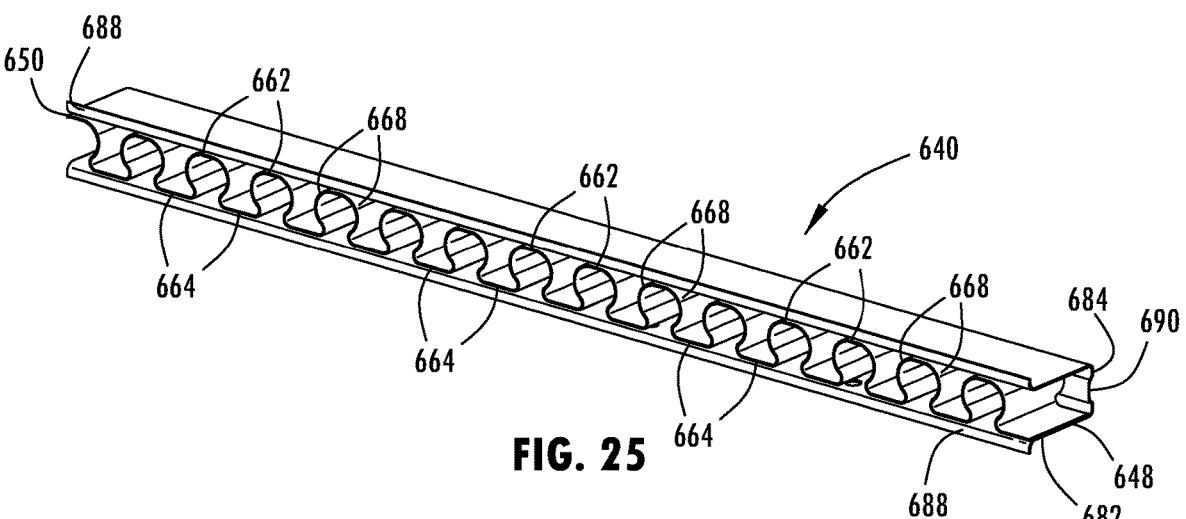
FIG. 25 is a perspective view of another example of the rocker insert.
Figure 26:
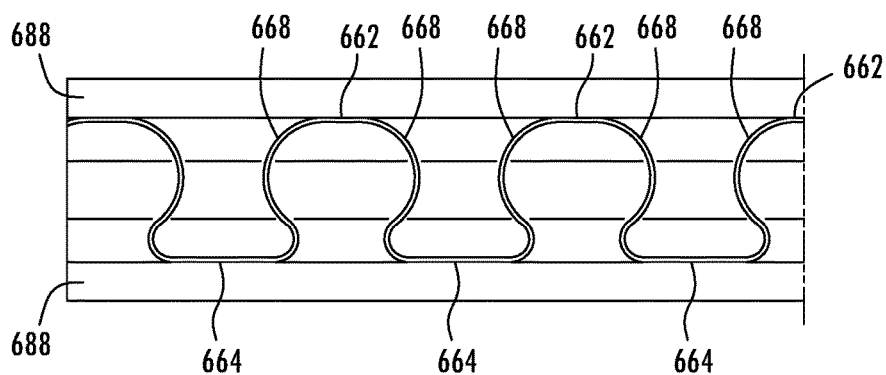
FIG. 26 is an enlarged side view of the rocker insert shown in FIG. 25.
Figure 27:
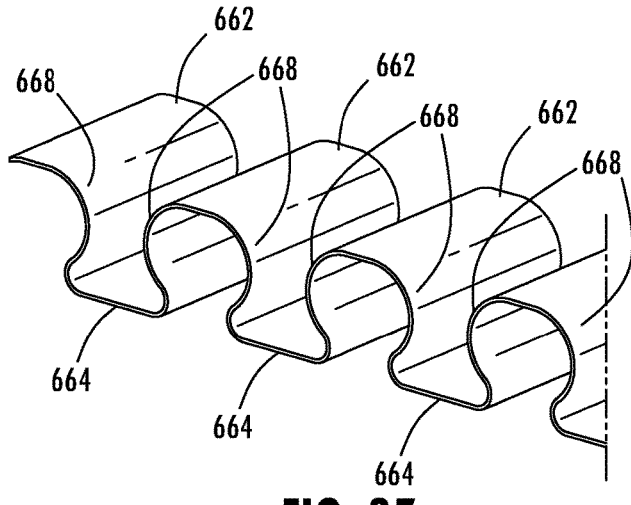
FIG. 27 is an enlarged perspective view of the wave-shaped structure of the rocker insert shown in FIG. 25.
Figures 32, 33, 34, 35:
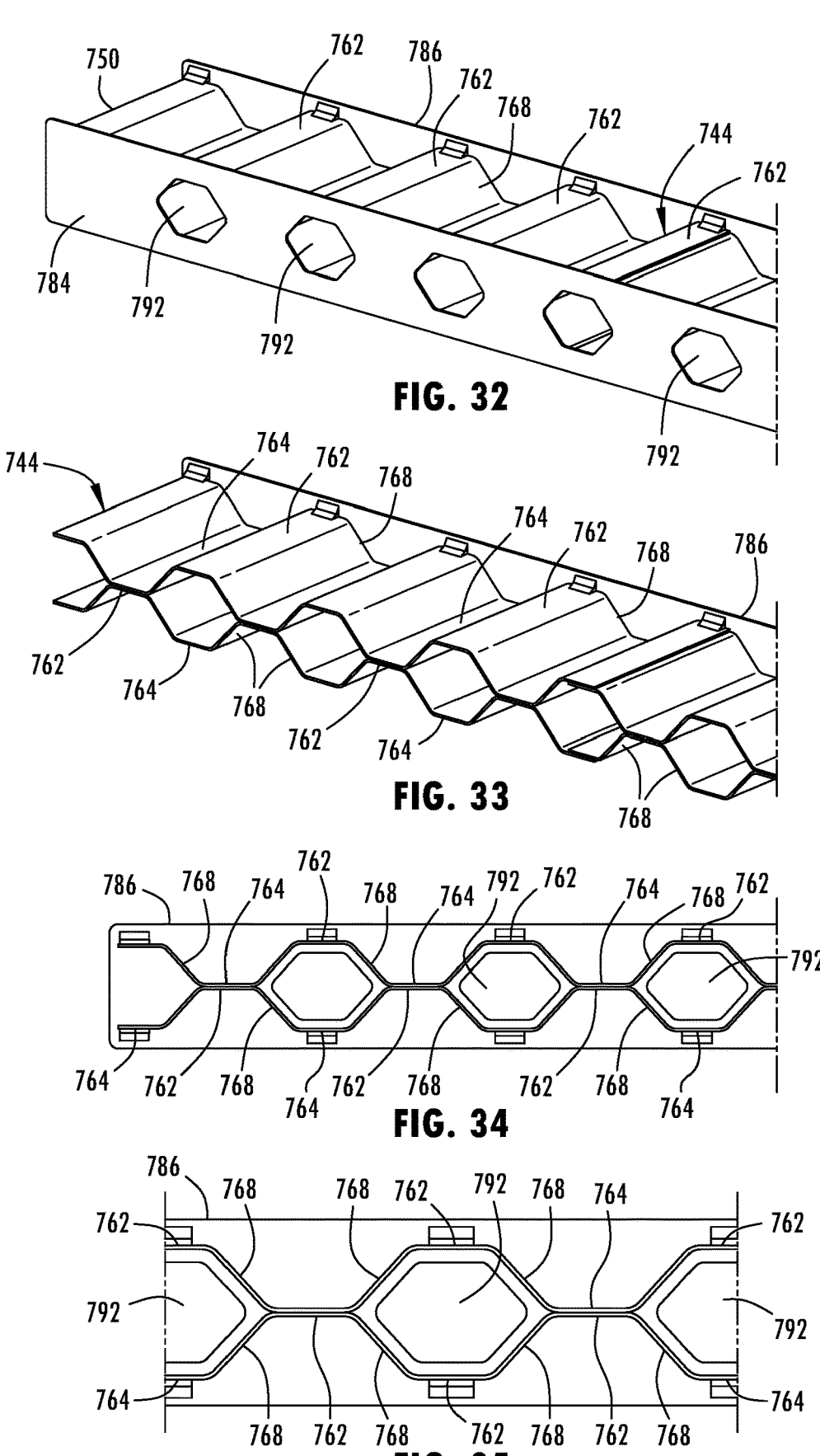
FIG. 32 is an enlarged view of the rocker insert shown in FIG. 28.
FIG. 33 is a perspective view of the rocker insert shown in FIG. 28 having a first sidewall removed.
FIG. 34 is a side view of the rocker insert shown in FIG. 33.
FIG. 35 is a side view of another portion of the rocker insert shown in FIG. 28 having the first sidewall removed.
Figures 36, 37, 38:
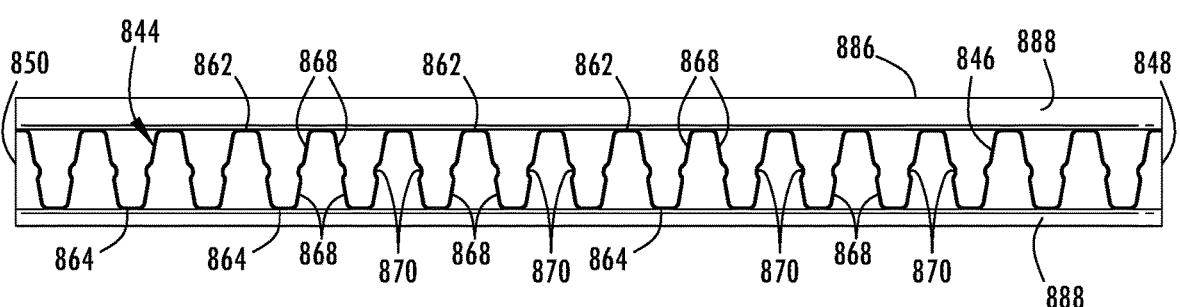
FIG. 36 is a perspective view of another example of the rocker insert.
FIG. 37 is a perspective view of the rocker insert shown in FIG. 36 having a first side wall removed.
FIG. 38 is a side view of the rocker insert shown in FIG. 37.

Referring now to the example shown in FIGS. 25-27, the rocker assembly 610 includes similar features to the features described above with respect to the rocker assembly 10 shown in FIGS. 1-9B, including but not limited to the one more of the sill outer 664 or sill inner 662, and the rocker insert 640 including the top wall 680, the bottom wall 682, and the side wall 684 along with the stiffening member 642 defining the wave-shaped structure 644 including the sheet 646 with the fore edge 648 and the aft edge 650 disposed at different locations along the length of the rocker insert 640. Additionally, the example shown in FIGS. 25-27 has a similar angle of extension of the angled portion as the example shown in FIGS. 22-24. However, as illustrated in the example shown in FIGS. 25-27, the angled portions 668 of the wave-shaped structure 644 do not include reinforcement ribs and instead have a smooth curve which extends from the crest 662 to the trough 664. As such, the distance between the first crest 662 and the second crest 662 is approximately equal to the width of the trough 664. Similarly, as best shown in FIG. 23, the distance between the first trough 664 and the second trough 664 is approximately equal to than the width of the crest 662.

Referring now to the example shown in FIGS. 28-35, the rocker assembly 710 includes similar features to the features described above with respect to the rocker assembly 10 shown in FIGS. 1-9B, including but not limited to the one more of the sill outer 714 or sill inner 712, and the rocker insert 740 including the stiffening member 742 defining the wave-shaped structure 744 including the sheet 746 with the fore edge 748 and the aft edge 750 disposed at different locations along the length of the rocker insert 740. However, in the example shown in FIGS. 28-35, the wave-shaped structure 744 is comprised of a first sheet 744 and a second sheet 744 which are coupled on top of one another. In the example shown, the first sheet 744 and the second sheet 744 are coupled such that the trough 764 of the first sheet 744 is coupled to the crest 762 of the second sheet 744 and forms a generally hexagonal repeating structure. As described above, the coupling is typically accomplished by welding, however, various other coupling methods have also been contemplated including but not limited to the use of fasteners and/or adhesive. Additionally, as shown in FIGS. 28-35, the wave-shaped structure 744 is coupled to a first side wall 784 and a second side wall 786. Again, the coupling is typically accomplished by welding, however, various other coupling methods have also been contemplated including but not limited to the use of fasteners and/or adhesive. In the example shown, the first side wall 784 and the second side wall 786 are generally identical, planar walls which extend the length of the rocker insert 740. Moreover, the first and second side walls 784, 786 may include at least one aperture 792. The aperture 792 may be a repeating aperture as illustrated in FIGS. 28-35, may be a single aperture, or another arrangement of apertures. Additionally, other side wall shapes and configurations have been contemplated. In one example, the rocker insert 740 is a plastic/metal hybrid such that one or more components of the wave-shaped structure or the side walls are comprised of a plastic material and one or more of the components of the wave-shaped structure or the sill walls are comprised of a metal material. In the example shown, it is contemplated that the wave-shaped structure 714 may include a core comprised of plastic configured to provide additional strength to the rocker insert 740.

Figure 39:
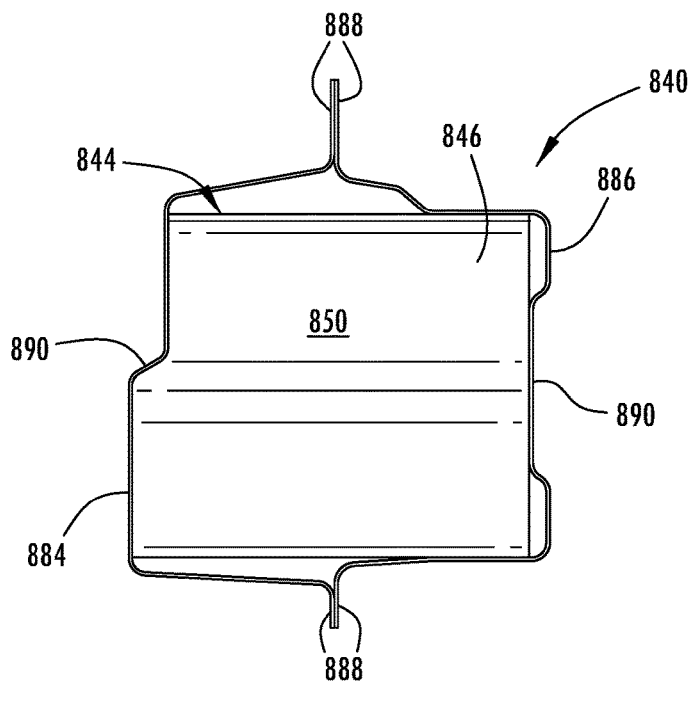
FIG. 39 is a cross-sectional view of the rocker insert shown in FIG. 36.
Figure 40:
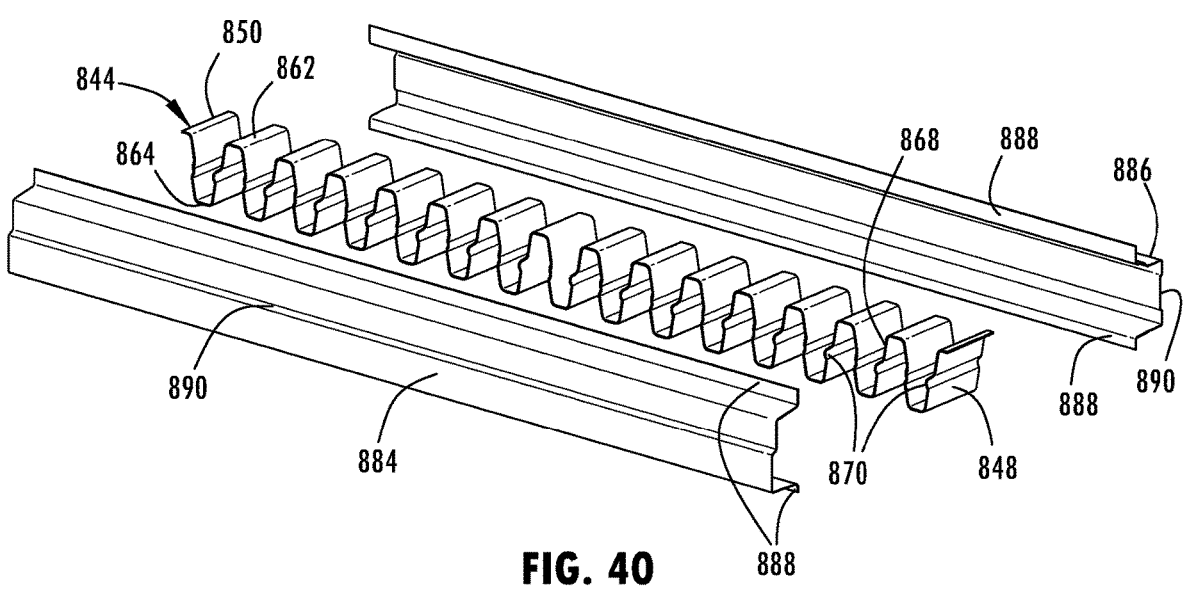
FIG. 40 is an exploded view of the rocker insert shown in FIG. 36.

Referring now to the example shown in FIGS. 36-40, the rocker assembly 810 includes similar features to the features described above with respect to the rocker assembly 10 shown in FIGS. 1-9B, including but not limited to the one more of the sill outer 814 or sill inner 812, and the rocker insert 840 including the stiffening member 842 defining the wave-shaped structure 844 including the sheet 846 with the fore edge 848 and the aft edge 850 disposed at different locations along the length of the rocker insert 840. However, in the example shown in FIGS. 36-40, the stiffening member is configured to replace one or more of the sill outer 814 or the sill inner 812. The stiffening member 842 includes the first side wall 884 and the second side wall 886 which are configured to be joined together to form a hollow interior which the wave-shaped structure 844 is disposed within. As best illustrated in FIG. 39, the first side wall 884 and the second side wall 886 each have flange portions 888 on the top and bottom which are configured to be joined together in a similar way as a traditional sill outer and sill inner, i.e. by coupling a top flange portion of the first side wall 884 with a top flange portion of the second side wall 886 and coupling a bottom flange portion of the first side wall 884 with a bottom flange portion of the second side wall 886. Having the stiffening member 842 have a similar shape to the sill outer 814 and sill inner 812 allows for replacement of one or more of the sill outer 814 and the sill inner 812 by the stiffening member 842. In other words, the stiffening member 842 may be directly coupled to other vehicle components typically coupled to the sill inner 812 or the sill outer 814. In the example shown, the first side wall 884 is similar to the side wall 884 described above with respect to FIGS. 1-9B including having a recessed portion 890. However, the recessed portion 890 shown in FIGS. 36-40 is more angular than curved, although various configurations have been contemplated, Additionally, the second side wall 886 also includes a recessed portion, however, the recessed portion on the second side wall 886 extends from the recessed portion to a top surface of the second side wall 886. Other locations and configurations of recessed portions have also been contemplated. Additionally, it is contemplated that any of the wave-shaped structures 44, 144, 244, 344, 444, 544, 644, 744 described herein may be disposed within a similar stiffening member 842.

Figure 41:
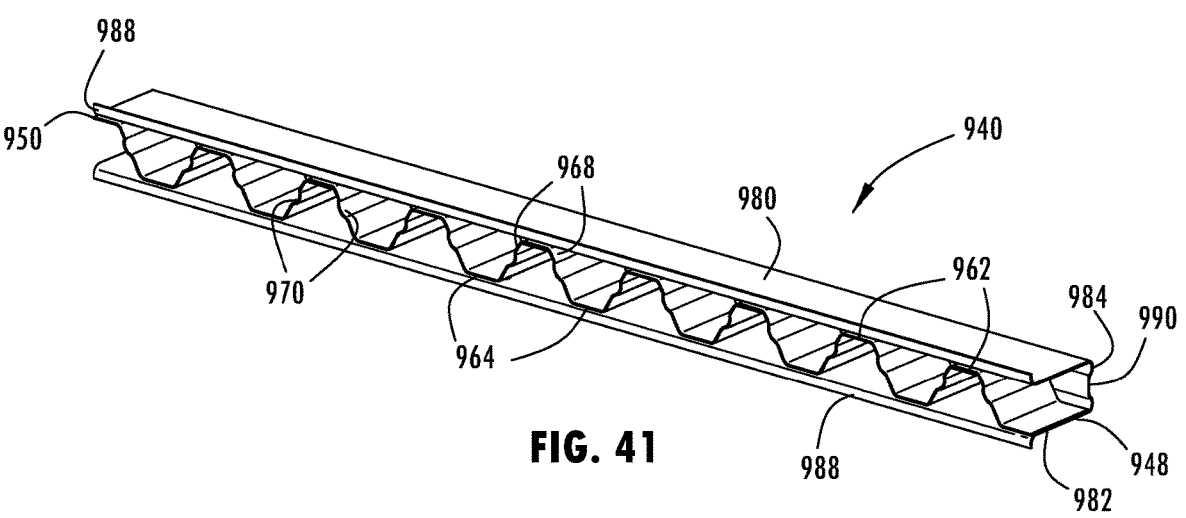
FIG. 41 is a perspective view of another example of the rocker insert.
Figure 42:
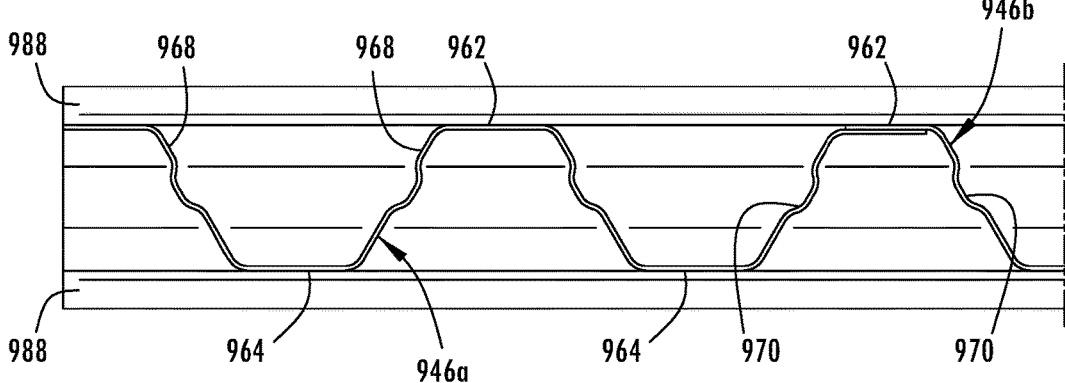
FIG. 42 is an enlarged side view of a section of the rocker insert shown in FIG. 41.
Figure 42:
Figure 43:
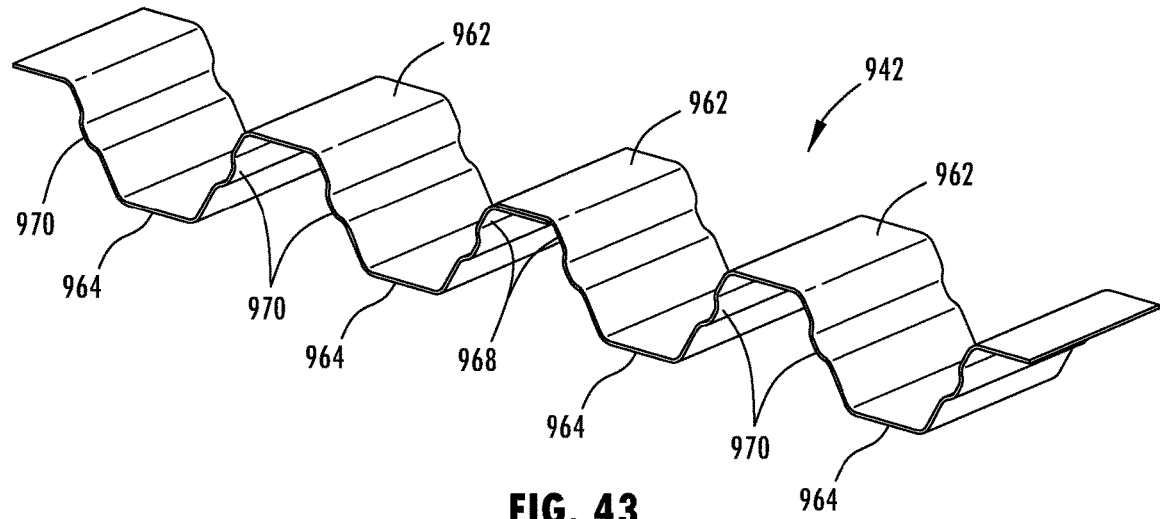
FIG. 43 is a perspective view of a section of the stiffening member of the rocker insert shown in FIG. 41.

Referring now to the example shown in FIGS. 41-43, the rocker insert 940 and the corresponding rocker assembly includes similar features to the features described above with respect to the rocker assembly shown in FIGS. 1-9B, including but not limited to the one more of the sill outer or sill inner that defines an elongated hollow interior for receiving the rocker insert. The rocker insert 940 includes a channel member or support member that has a top wall 980, a bottom wall 982, and the side wall 984 along with a stiffening member 942 that defines a wave-shaped structure. The stiffening member 942 includes a plurality of metal sheets 946a, 946b (FIG. 42) with the fore edge of one sheet 946a attached to the aft edge of the adjacent sheet 946b. Specifically, each metal sheet shown includes three crest portions 962 and two trough portions 964, where the crest portions 962 of the adjacent wave-shaped sheets are attached in a lap joint configuration. The lap joint of the adjacent sheet portions are attached with welding, such as via spot welding, laser welding, or the like. It is also contemplated that the adjacent sheets may include different shapes, materials, sheet thickness, or other characteristics, such that the reinforcement insert formed by the plurality of sheets may have a variable strength along its length, for example to be capable of tuning specific sections of the length to different impact load path or crush demands. It is also contemplated that the adjacent sheets may include a space between the adjacent fore and aft ends, such as to provide a section of the rocker insert with a lower stiffness at the spacing. In such an example, the rocker insert includes a discontinuous stiffening member along the length of the support member. Additionally, the example shown in FIGS. 41-43 has a similar angle of extension of the angled portion 968 as the example shown in FIGS. 8A-9B, as well as a similar reinforcement rib 970 as those shown in FIGS. 8A-9B.

It is also contemplated that the internal reinforcements of the disclosed vehicle rocker assembly may be incorporated in other types of structural beams, such as in frames and structures of automotive and marine vehicles, buildings, storage tanks, furniture, and the like. With respect to vehicle applications, the vehicle component disclosed herein may be incorporated with various applications of different structural components. The vehicle component may be designed to support and sustain different loading conditions, such as for supporting certain horizontal spans or axial loading conditions. Also, the vehicle component may be designed to undergo various impact forces, such as for the illustrated rocker assemblies, pillar structures, and the like. The cross-sectional geometry, material type selections, and material thickness within the cross-sectional profile of the vehicle component may be configured for such a particular use and the desired loading and performance characteristics, such as the weight, load capacity the beam, force deflection performance, and impact performance of the vehicle component.

For purposes of this disclosure, the term "coupled" (in all of its forms, couple, coupling, coupled, etc.) generally means the joining of two components directly or indirectly to one another. Such joining may be stationary in nature or movable in nature; may be achieved with the two components and any additional intermediate members or by being integrally formed as a single unitary body with one another or with the two components; and may be a fixed attachment or may be a an interfacing or abutting contact, unless otherwise stated.

Also, for purposes of this disclosure, the articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle rocker assembly comprising:
a sill structure having an inboard wall portion and an outboard wall portion defining an elongated hollow interior there between; and
a rocker insert disposed within the elongated hollow interior, the rocker insert comprising:
a channel member having a top wall, a bottom wall, and a side wall connecting along the top and bottom walls to define a channel area, and a stiffening member having a metal sheet with a length extending along at least a portion of the elongated hollow interior and disposed along the channel area,
wherein the metal sheet of the stiffening member includes a wave-shaped structure with crest portions and trough portions alternating at spaced locations along the length of metal sheet,
wherein the crest portions abut the top wall of the channel member and the trough portions abut the bottom wall of the channel member, and
wherein the crest portions and the trough portions extend between inner and outer edges of the metal sheet and are configured to carry a load path laterally between the inboard and outboard wall portions of the sill structure.

2. The vehicle rocker assembly of claim 1, wherein the length of the metal sheet extends between a fore edge and an aft edge of the metal sheet, the fore and aft edges disposed at spaced locations along the elongated hollow interior of the sill structure.

3. The vehicle rocker assembly of claim 1, wherein a sheet thickness of the metal sheet is defined between upper and lower surfaces of the metal sheet that span between the inner and outer edges, and wherein the upper surface faces upward in the sill structure and the lower surfaces faces downward in the sill structure.

4. The vehicle rocker assembly of claim 1, wherein the crest portions and the trough portions of the wave-shaped structure comprise a consistent cross-sectional shape extending laterally between the inner and outer edges of the metal sheet.

5. The vehicle rocker assembly of claim 4, wherein the cross-sectional shape of the crest portions mirror the cross-sectional shape of the trough portions.

6. The vehicle rocker assembly of claim 4, wherein the cross-sectional shape of the crest portions of the wave-shaped structure includes a central planar section.

7. The vehicle rocker assembly of claim 6, wherein the stiffening member is disposed along the channel area with the central planar section of the crest portions attached at the top wall of the channel member.

8. The vehicle rocker assembly of claim 1, wherein the stiffening member includes a second wave-shaped sheet extending along the elongated hollow interior.

9. The vehicle rocker assembly of claim 8, wherein a fore end of the second wave-shaped sheet is attached to an aft end of the metal sheet.

10. The vehicle rocker assembly of claim 1, wherein at least one of the inner or outer edges of the metal sheet is coupled with the respective inboard or outboard wall portions of the sill structure.

11. The vehicle rocker assembly of claim 1, wherein the inner and outer edges of the metal sheet extend parallel to one another along the length of the metal sheet.

12. A rocker insert configured to be disposed along a hollow interior of a vehicle sill structure, the rocker insert comprising:
a channel member having a top wall, a bottom wall, and a side wall connecting along the top and bottom walls to define a channel area, and
a stiffening member comprising a metal sheet defining a wave-shaped structure along a length of the metal sheet, the wave-shaped structure disposed along the channel area,
wherein the wave-shaped structure includes crest portions and trough portions alternating at spaced locations along the length of the metal sheet, the wave-shaped structure having angled portions extending between the crest portions and the trough portions, wherein the crest portions abut the top wall of the channel member and the trough portions abut the bottom wall of the channel member, wherein the crest and trough portions of the wave-shaped structure extend between an inner edge and an outer edge of the metal sheet, and wherein a sheet thickness of the metal sheet is defined between upper and lower surfaces of the metal sheet that span between the inner and outer edges, such that the upper surface is configured to face upward in the vehicle sill structure and the lower surfaces is configured to face downward in the vehicle sill structure.

13. The rocker insert of claim 12, wherein the sheet thickness of the metal sheet is between 0.08 mm to 4.0 mm.

14. The rocker insert of claim 12, wherein the metal sheet includes a fore edge and an aft edge are disposed at opposing ends of the stiffening member.

15. The rocker insert of claim 14, wherein the stiffening member includes a second wave-shaped sheet with a fore end attached to the aft end of the metal sheet.

16. The rocker insert of claim 12, wherein the crest portions and the trough portions of the wave-shaped structure comprise a consistent cross-sectional shape extending laterally between the inner and outer edges of the metal sheet.

17. The rocker insert of claim 12, wherein the cross-sectional shape of the crest portions mirror the cross-sectional shape of the trough portions when taken across a vertical center of the stiffening member.

18. The rocker insert of claim 12, wherein the stiffening member is disposed along the channel area with the crest portions attached at the top wall of the channel member.

19. A vehicle rocker assembly comprising:

a sill structure having an inboard wall portion and an outboard wall portion defining an elongated hollow interior there between; and a rocker insert disposed within the elongated hollow interior, the rocker insert comprising:

a stiffening member comprising a metal sheet with a length extending along at least a portion of the elongated hollow interior; and a support member having a top wall and a bottom wall attached along the length of the stiffening member;

wherein the metal sheet of the stiffening member includes a wave-shaped structure with crest portions and trough portions alternating at spaced locations along the length of the metal sheet, the crest portions contacting the top wall of the support member and the trough portions contacting the bottom wall of the support member, and wherein the crest portions and the trough portions extend between inner and outer edges of the metal sheet and are configured to carry a load path laterally between the inboard and outboard wall portions of the sill structure.

20. The vehicle rocker assembly of claim 19, wherein a sheet thickness of the metal sheet is defined between upper and lower surfaces of the metal sheet that span between the inner and outer edges, and wherein the upper surface faces upward in the sill structure and the lower surfaces faces downward in the sill structure.

* * * * *